United States Patent
Fujita et al.

(10) Patent No.: US 7,720,717 B2
(45) Date of Patent: May 18, 2010

(54) MOBILE TERMINAL DEVICE, MOBILE TERMINAL METHOD, MOBILE TERMINAL PROGRAM, AND ELECTRONIC MONEY SERVER

(75) Inventors: Norihiko Fujita, Tokyo (JP); Koji Ito, Tokyo (JP); Hisanori Arai, Tokyo (JP); Masaji Nagai, Tokyo (JP)

(73) Assignee: Sony Corporation, Tokyo (JP)

( * ) Notice: Subject to any disclaimer, the term of this patent is extended or adjusted under 35 U.S.C. 154(b) by 64 days.

(21) Appl. No.: 10/547,977
(22) PCT Filed: Mar. 5, 2004
(86) PCT No.: PCT/JP2004/002862

§ 371 (c)(1),
(2), (4) Date: Oct. 31, 2005

(87) PCT Pub. No.: WO2004/079616

PCT Pub. Date: Sep. 16, 2004

(65) Prior Publication Data

US 2006/0100933 A1     May 11, 2006

(30) Foreign Application Priority Data

Mar. 7, 2003    (JP) .............................. 2003-061944

(51) Int. Cl.
    *G06Q 30/00*     (2006.01)
    *G06Q 40/00*     (2006.01)
    *G06F 11/30*     (2006.01)
    *G06F 12/14*     (2006.01)

(52) U.S. Cl. ............................. 705/26; 705/39; 705/40; 705/41; 705/44; 713/191

(58) Field of Classification Search ........................ None
See application file for complete search history.

(56) References Cited

U.S. PATENT DOCUMENTS 5,796,832 A * 8/1998 Kawan ........................ 705/65

6,198,915 B1    3/2001 McGregor et al. .......... 455/406
6,282,656 B1 * 8/2001 Wang ............................ 726/4

(Continued)

FOREIGN PATENT DOCUMENTS

EP     0950968     10/1999
EP     1221669     7/2002

(Continued)

OTHER PUBLICATIONS

Bien Perez, Wireless trend prompts safeguard expansion, Dec. 27, 2001, South China Morning Post, Hong Kong, p. 6.*

(Continued)

*Primary Examiner*—James Trammell
*Assistant Examiner*—Scott S Trotter
(74) *Attorney, Agent, or Firm*—K&L Gates LLP

(57) ABSTRACT

A mobile terminal device has an information processing unit that processes electronic money information and a storage unit that stores the electronic money information. A receiving unit receives from an electronic money server an electronic money identification (ID), a mobile terminal identification (ID) identifying the mobile terminal device, and a money information processing program for enabling the information processing unit to execute processing of the money information stored in the storage unit. An installation unit installs into the storage unit the money information processing program and the IDs received by the receiving unit. A sending unit sends to the electronic money server information necessary for enabling the electronic money server to provide electronic money service, the necessary information being sent to the electronic server before the receiving unit receives the money information processing and the IDs.

25 Claims, 14 Drawing Sheets

U.S. PATENT DOCUMENTS

| | | | |
|---|---|---|---|
| 6,321,078 | B1 | 11/2001 | Menelli et al. ............... 455/407 |
| 6,434,403 | B1 * | 8/2002 | Ausems et al. ........... 455/556.2 |
| 2001/0034725 | A1 | 10/2001 | Park et al. |
| 2002/0049662 | A1 | 4/2002 | Oshima et al. |
| 2002/0052838 | A1 | 5/2002 | Yamada et al. |
| 2002/0064074 | A1 | 5/2002 | Kamise et al. |
| 2006/0136548 | A1 | 6/2006 | Nishio et al. ................ 709/203 |

FOREIGN PATENT DOCUMENTS

| | | |
|---|---|---|
| JP | 2000 112719 | 4/2000 |
| JP | 2000-259148 | 9/2000 |
| JP | 2000259148 | 9/2000 |
| JP | 2001-291032 | 10/2001 |
| JP | 2002-004886 | 1/2002 |
| JP | 2002 042216 | 2/2002 |
| JP | 2002 073973 | 3/2002 |
| JP | 2002-135424 | 5/2002 |
| JP | 2002-329053 | 11/2002 |
| JP | 2002329053 | 11/2002 |
| JP | 2002-352173 | 12/2002 |
| JP | 2003-016041 | 1/2003 |
| JP | 2003 022483 | 1/2003 |
| JP | 2003016041 | 1/2003 |
| JP | 2004-102698 | 4/2004 |
| JP | 2004102698 | 4/2004 |
| WO | 9625828 | 8/1996 |
| WO | 9745814 | 12/1997 |
| WO | 0248869 | 6/2002 |

OTHER PUBLICATIONS

Unknown, Pocket Quicken, Mar. 31, 2001, www.landware.com downloaded from www.archive.org, pp. 1-2.*
Unknown, QuickBooks, 1998, Intuit Inc., p. 111.*
Patent Abstract of Japan (NEC Corp.), Oct. 19, 2001, publication No. JP20011291039, publication date Oct. 19, 2001.
Patent Abstracts of Japan (Sony Corp.), Jun. 28, 2002, publication No. JP2002185446, publication date Jun. 28, 2002.

* cited by examiner

| | 61 | 62 | 63 | 64 | 65 | 66 |
|---|---|---|---|---|---|---|
| | ELECTRONIC-MONEY ID | USER NAME | PASSWORD | ISSUER | IC CHIP ID | STATUS | ... |
| | 12345678 | YAMADA TARO | abcdefg | ISSUER A | 547816 | INSTALLED | ... |
| | 87654321 | KATO TETSUYA | hijklmn | ISSUER B | 854756 | INSTALLED | ... |
| | ... | ... | ... | ... | ... | ... | ... |

FIG.8

| ELECTRONIC-MONEY ID | CHARGE | | | SETTLE | | |
|---|---|---|---|---|---|---|
| | TERMINAL ID | DATE AND TIME | VALUE | TERMINAL ID | DATE AND TIME | VALUE |
| 12345678 | ... 547816 ... 347895 | ... ... ... | ... 1000 ... 3000 | ... 2547657 | ... | ... 2000 |
| 87654321 | ... | ... | ... | ... | ... | ... |
| ... | ... | ... | ... | ... | ... | ... |

67 — ELECTRONIC-MONEY ID column
68 — CHARGE
69 — SETTLE
71 → 547816
72 → 347895
73 → 2547657

(a)

(b)

MOBILE TERMINAL DEVICE, MOBILE TERMINAL METHOD, MOBILE TERMINAL PROGRAM, AND ELECTRONIC MONEY SERVER

CROSS REFERENCE TO RELATED APPLICATIONS

This application is a U.S. national stage application of copending International Application No. PCT/JP2004/002862, filed Mar. 5, 2004, claiming a priority date of Mar. 7, 2003, and published in a non-English language.

TECHNICAL FIELD

The present invention relates to a mobile phone device, and more particularly, to a mobile phone using electronic-money service.

BACKGROUND ART

In recent years, a demonstration test of a settlement system using electronic money has been successful and the electronic money is put into practical use.

Currently, a retail shop uses the electronic money for settlement. Further, in order to widespread the electronic money to general users, efforts are made to develop a technology of elements and structure a business model.

In addition to the retail shop, a system using the electronic money is put into practical use to adjust the fare of a train or bus.

With the electronic money, an electronic-money card stores the same exchange value, that is, so-called value, as the money, and is used as an electronic wallet.

The value is written to the electronic-money card by a specific terminal device (hereinafter, referred to as an electronic-money terminal). The processing for writing the value is called charge. Upon charging the value, the money corresponding to the value is collected from a user. Thus, the actual money corresponds to the value, thereby keeping the exchange value of the value for security.

The settlement using the value is executed by subtracting the amount of money corresponding to the settlement from the value stored in the electronic-money card on the electronic-money terminal.

The electronic-money card comprises a non-contact IC (Integrated Circuit) card or a contact IC card.

The electronic-money card comprising the non-contact IC card comprises: an IC chip having a value processing function and a value storing function; and an antenna for communication with the electronic-money terminal. The antenna has a function for wireless communication with the electronic-money terminal and further has a function for generating the power for receiving the electronic waves from the electronic-money terminal and driving the IC chip.

The electronic-money terminal communicates by radio waves with the IC chip via the antenna, and accesses the IC chip in the electronic-money card, thereby performing various processing for value (writing processing, subtraction, and reference to the balance, hereinafter, referred to as value processing).

Mainly, using forms of the electronic-money card are as follows.

(1) Charge Value

First, in a shop in which an electronic-money terminal is installed, an electronic-money card is set to the electronic-money terminal, and the writing operation of a value is requested to a person in charge. In this case, the money corresponding to the value is paid.

Next, the person in charge operates the electronic-money terminal to write the value of charge to the electronic-money terminal.

Then, the electronic-money terminal sends a write command for adding the money corresponding to the value to the IC chip in the electronic-money card.

The IC chip receives the write command and executes the command, thereby adding the money of value stored in the IC chip.

As mentioned above, the value is charged to the electronic-money card.

Incidentally, in an unmanned electronic-money terminal, the electronic money card is set and the money is set to the electronic-money card, thereby automatically charging the value.

(2) Settle by Value

First, a product or service, serving as a target of settlement, is presented to a person in charge of an electronic-money terminal. An electronic-money card is set to the electronic-money terminal installed to a shop, and a message indicating the settlement using the value is sent to the person in charge.

On the contrary, the person in charge operates the electronic-money terminal to subtract the money for settlement from the value stored in the electronic-money card.

Then, the electronic-money terminal sends a subtract command for subtracting the value corresponding to the money to the IC chip in the electronic-money card.

The IC chip receives the subtract command and executes the command, thereby subtracting the value corresponding to the value stored in the IC chip.

As mentioned above, the settlement is performed by using the value in the electronic-money card.

Incidentally, in an electronic-money terminal installed to a vending machine, a user purchases a product, and the value is automatically settled.

(3) Use Electronic Money on Internet

With a terminal device having an Internet access function and a reader/writer for reading/writing data to/from an electronic-money card, a value is charged to the electronic-money card or a settlement is performed by a value stored in the electronic-money card.

When a value is to be charged, the electronic-money card is set to the reader/writer and is accessed to a Web site for charge on the terminal device. Then, the communication is established between a server device and the electronic-money card, and the server device writes the value to the electronic-money card. The money corresponding to the written value is withdrawn from a bank account of a user, or is processed by a credit card.

In the settlement using the value, similarly, the communication is established between the server device and the electronic-money card, and the value is subtracted.

As mentioned above, the electronic-money card is used as a pre-paid electronic wallet and, in particular, it is advantageous for a user in the settlement of a small amount of money because the small change does not burden the user.

Recently, the mobile phone is excessively spread and it is tried that the mobile phone has the same function as that of the electronic-money card.

If the mobile phone has the same function as that of the electronic-money card, a user charges the value to the mobile phone or settles the money by the value stored in the mobile phone.

As mentioned above, the following technology allows the mobile phone to have the function of the electronic-money card.

(Patent Document 1)

Japanese Unexamined Patent Application Publication-No. 2002-352173

According to the invention disclosed in Patent Document 1, a specific memory for storing the value to the mobile phone is provided, and the value is charged or the money is settled by the stored value.

Upon installing the same value processing function as that of the electronic-money card to the mobile phone, the install timing is a problem.

Upon installing the value processing function to the mobile phone, various information on the security must be installed.

If the install processing is commissioned to an external operator, then, information on the security is transferred to the commission site, and the information is not managed in the company itself.

SUMMARY OF THE INVENTION

Then, it is an object of the present invention to provide a mobile terminal device in which information is easily managed upon installing the value processing function.

In order to solve the object, according to a first aspect of the invention, there is provided a mobile terminal device comprising: information processing means for processing electronic information; storing means for storing the electronic information; generating means for generating money information storing means for storing money information to the storing means; secret information receiving means for being connected to a providing server device for providing predetermined secret information and for receiving the secret information from the providing server device; and installing means for installing, into the storing means, a money information processing program for enabling the information processing means to execute money information processing and the received secret information, wherein the money information processing program enables the information processing means to realize a money-amount information receiving function for receiving changing information of the amount of money from a predetermined terminal device or a predetermined server device by using the installed secret information and a money information processing function for changing the amount of money of the money information stored in the money information storing means by using the received changing information of the amount of money.

According to the invention, in the mobile terminal device the secret information is identification information for identifying the mobile terminal device by the predetermined terminal device or the predetermined server device.

According to the invention the mobile terminal device further comprises: ID information receiving means for receiving registering ID information from the providing server device; and display means for displaying information, wherein the installing means installs the received registering ID information to the storing means so as to display the received registering ID information on the display means.

According to the invention, in the mobile terminal device the money information processing program enables the information processing means to realize an ID sending function for sending, to the predetermined terminal, the registering ID information installed upon receiving the changing information of the amount of money from the predetermined terminal by the money-amount information receiving function.

According to a second aspect of the invention, a mobile terminal method executed by a computer comprises information processing means for processing electronic information, storing means for storing the electronic information, generating means, secret information receiving means, and installing means, the mobile terminal method comprising: a generating step of generating money information storing means for storing money information to the storing means; a secret information receiving step of enabling the connection to a providing server device for providing predetermined secret information and for receiving the secret information from the providing server device by the secret information receiving means; and an installing step of installing, into the storing means, a money information processing program for enabling the information processing means to execute money information processing and the received secret information, wherein the money information processing program enables the information processing means to realize a money-amount information receiving function for receiving changing information of the amount of money from a predetermined terminal device or a predetermined server device by using the installed secret information and a money information processing function for changing the amount of money of the money information stored in the money information storing means by using the received changing information of the amount of money.

According to a third aspect of the invention, a mobile terminal program for a computer comprises information processing means for processing electronic information and storing means for storing the electronic information to execute: a generating function for generating money information storing means for storing money information to the storing means; a secret information receiving function for enabling the connection to a providing server device for providing predetermined secret information and receiving the secret information from the providing server device; and an installing function for installing, into the storing means, a money information processing program for enabling the information processing means to execute money information processing and the received secret information, wherein the money information processing program enables the information processing means to realize a money-amount information receiving function for receiving changing information of the amount of money from a predetermined terminal device or a predetermined server device by using the installed secret information and a money information processing function for changing the amount of money of the money information stored in the money information storing means by using the received changing information of the amount of money.

According to a fourth aspect of the invention, a providing server device for providing secret information to a mobile terminal device according to the first aspect comprises: connecting means for enabling the connection to the mobile terminal device; and sending means for sending the secret information to the connected mobile terminal device.

According to a fifth aspect of the invention a providing server method executed by a computer comprising connecting means and sending means, for providing secret information to a mobile terminal device according to the first aspect comprises: a connecting step of enabling the connection to the mobile terminal device by the connecting means; and a sending step of sending the secret information to the connected mobile terminal device by the sending means.

According to a sixth aspect of the invention, a providing server program for providing secret information to a mobile terminal device for enabling a computer to realize: a connecting function for enabling the connection to the mobile terminal device; and a sending function for sending the secret information to the connected mobile terminal device.

According to another embodiment of the invention, a mobile terminal device comprises: connecting means for enabling the connection to an information processing device comprising information processing means for processing electronic information and storing means for storing the electronic information; generating means for generating money information storing means for storing money information to the storing means for the connected information processing device; secret information receiving means for enabling the connection to a providing server device for providing predetermined secret information and for receiving the secret information from the providing server device; and installing means for installing, into the storing means of the connecter information processing device, a money information processing program for enabling the information processing means to execute money information processing and the received secret information, wherein the money information processing program enables the information processing means to realize a money-amount information receiving function for receiving changing information of the amount of money from a predetermined terminal device or a predetermined server device by using the installed secret information and a money information processing function for changing the amount of money of the money information stored in the money information storing means by using the received changing information of the amount of money.

According to another embodiment of the first aspect of the invention, a mobile terminal device comprises: connecting means for enabling the connection to storing means for storing electronic information; information processing means for processing electronic information; generating means for generating money information storing means for storing money information to the connected storing means; secret information receiving means for enabling the connection to a providing server device for providing predetermined secret information and for receiving the secret information from the providing server device; and installing means for installing, into the storing means, a money information processing program for enabling the information processing means to execute money information processing and the received secret information, wherein the money information processing program enables the information processing means to realize a money-amount information receiving function for receiving changing information of the amount of money from a predetermined terminal device or a predetermined server device by using the installed secret information and a money information processing function for changing the amount of money of the money information stored in the money information storing means by using the received changing information of the amount of money.

According to the present invention, secret information to install the value processing function to the mobile terminal device is easily managed.

BRIEF DESCRIPTION OF THE DRAWINGS

FIG. 8 is a diagram showing one example of the logical structure of transaction information;

DETAILED DESCRIPTION OF THE PREFERRED EMBODIMENTS

Hereinbelow, a preferred embodiment of the present invention will be described.

(1) Outline of Embodiments

A mobile phone having an Internet access function comprises an IC chip having the same function as that used for a non-contact electronic-money card; and an auxiliary program (hereinafter, referred to as an installing program for installing the value processing function to the IC chip by a server device. At the time that the mobile phone is sold, the value processing function is not installed to the IC chip of the mobile phone. A user purchases the mobile phone, then, the mobile phone communicates with the server device for communication, and the value processing function is installed to the IC chip.

At the installing time, the mobile phone sends, to an electronic-money server, information necessary for a carrier of electronic money, such as an IC chip ID (ID information uniquely assigned to the IC chip), and receives information necessary for using electronic-money service from the electronic-money server and installs the received information. The received and installed information includes secret information for security, such as key information, which will be described later.

After installing the value processing function, the function operates. Then, similarly to the electronic-money card, the IC chip charges the value or performs the value processing such as the settlement using the value.

The IC chip comprises an antenna for wireless communication with the electronic-money terminal, similarly to the electronic-money card. With the IC chip, the mobile phone is set to the electronic-money terminal to charge the value to the mobile phone, or the money is settled by the value stored in the mobile phone.

Further, the mobile phone comprises an Internet access function. Therefore, the value on the IC chip is charged from the server device on the Internet, or the money is settled by the value stored in the IC chip.

According to the embodiment, the mobile phone includes the IC chip (information processing device). Further, the IC chip may be detachable to the mobile phone, and may be attached to the mobile phone for use purpose.

Alternatively, the mobile phone may include a function unit corresponding to a CPU (information processing means) of the IC chip, and a function unit corresponding to a memory (memory means) of the IC ship may be detachable.

In the case of using a detachable IC chip or memory, a connector (connecting means) is arranged on the mobile phone side.

(2) Details of the Embodiment

Figure 1:
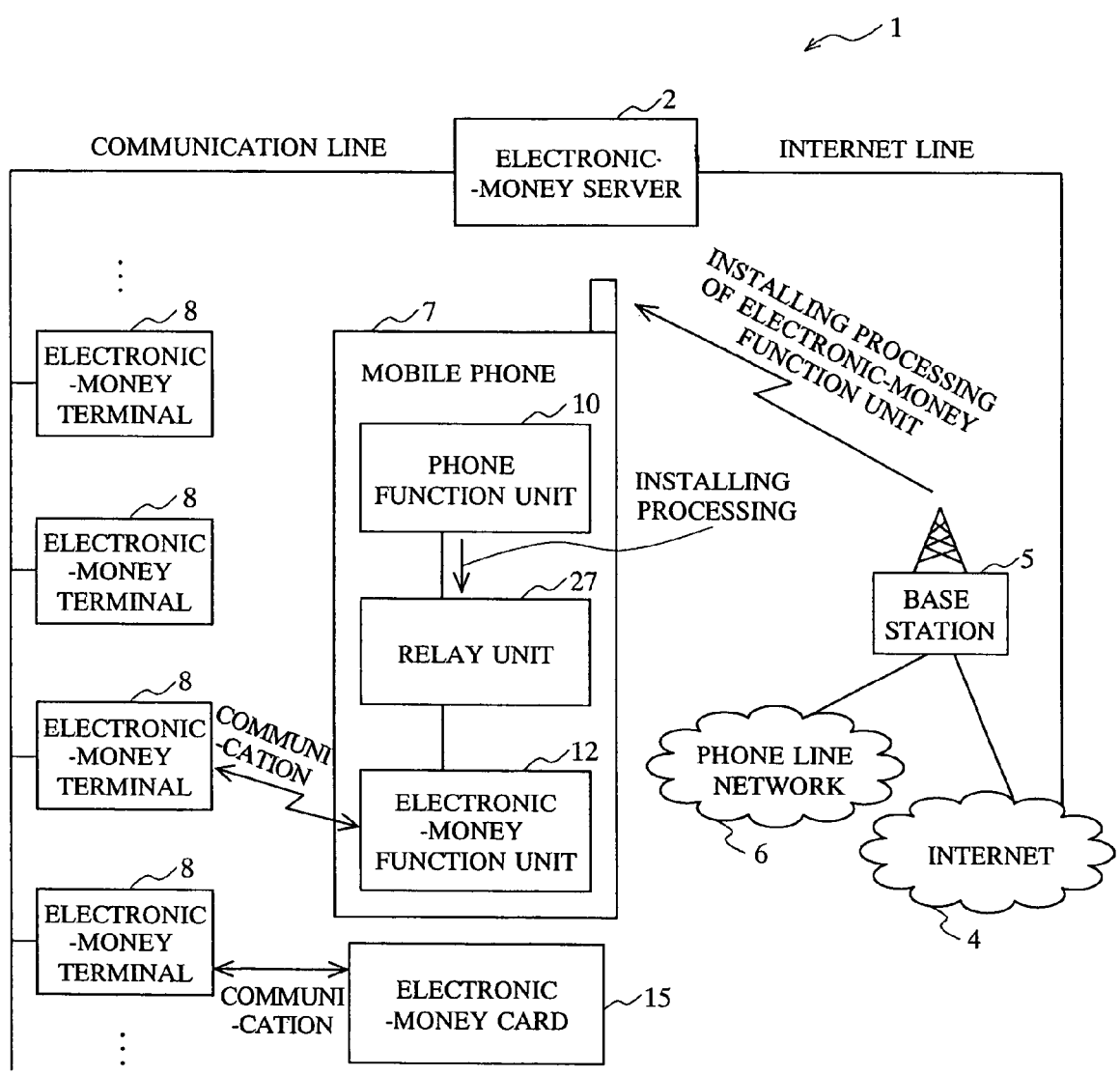
FIG. 1 is a diagram showing one example of the structure of an electronic-money system.

FIG. 1 is a diagram showing an example of an electronic-money operating system 1 according to the embodiment.

The electronic-money operating system 1 comprises: a mobile phone 7; an electronic-money server 2; an Internet 4; a base station 5; a phone line network 6; an electronic-money card 15; and electronic-money terminals 8, 8, 8 . . . .

Hereinbelow, the components will be described later.

The mobile phone 7 (mobile terminal device) comprises: a phone function unit 10; an electronic-money function unit 12; and a relay unit 27 which connects the phone function unit 10 to the electronic-money function unit 12.

The phone function unit 10 is a function unit having a function as a digital phone having an Internet access function. The electronic-money function unit 12 is a function unit for storing the value and processing the value, similarly to the electronic-money card 15 (which will be described later).

The communication is established between the phone function unit 10 and the electronic-money function unit 12 via the relay unit 27.

Here the value means money information indicating the amount of money having the money price as electronic information, and has the identical exchange value to the money. The money information is operated by increase/reduction, thereby moving the value. Thus, the value is used for settlement (e.g. of a consumer transaction).

The phone function unit 10 has two modes of a call mode and an application mode. A user uses communication service in the call mode. In the application mode, the user receives the service provided by the application.

The phone function unit 10 communicates with the base station 5 by radio waves, and accesses the phone line network 6 or Internet 4 via the base station 5.

Upon using the mobile phone 7 in the call mode, a communication line is established between the mobile phone 7 and a partner's phone via the phone line network 6.

Upon using the mobile phone 7 in the application mode, the mobile phone 7 is accessed to the Internet 4, thereby using services provided by server devices. In addition, service of a game is used off-line (without being accessed to the Internet 4).

Figure 2:
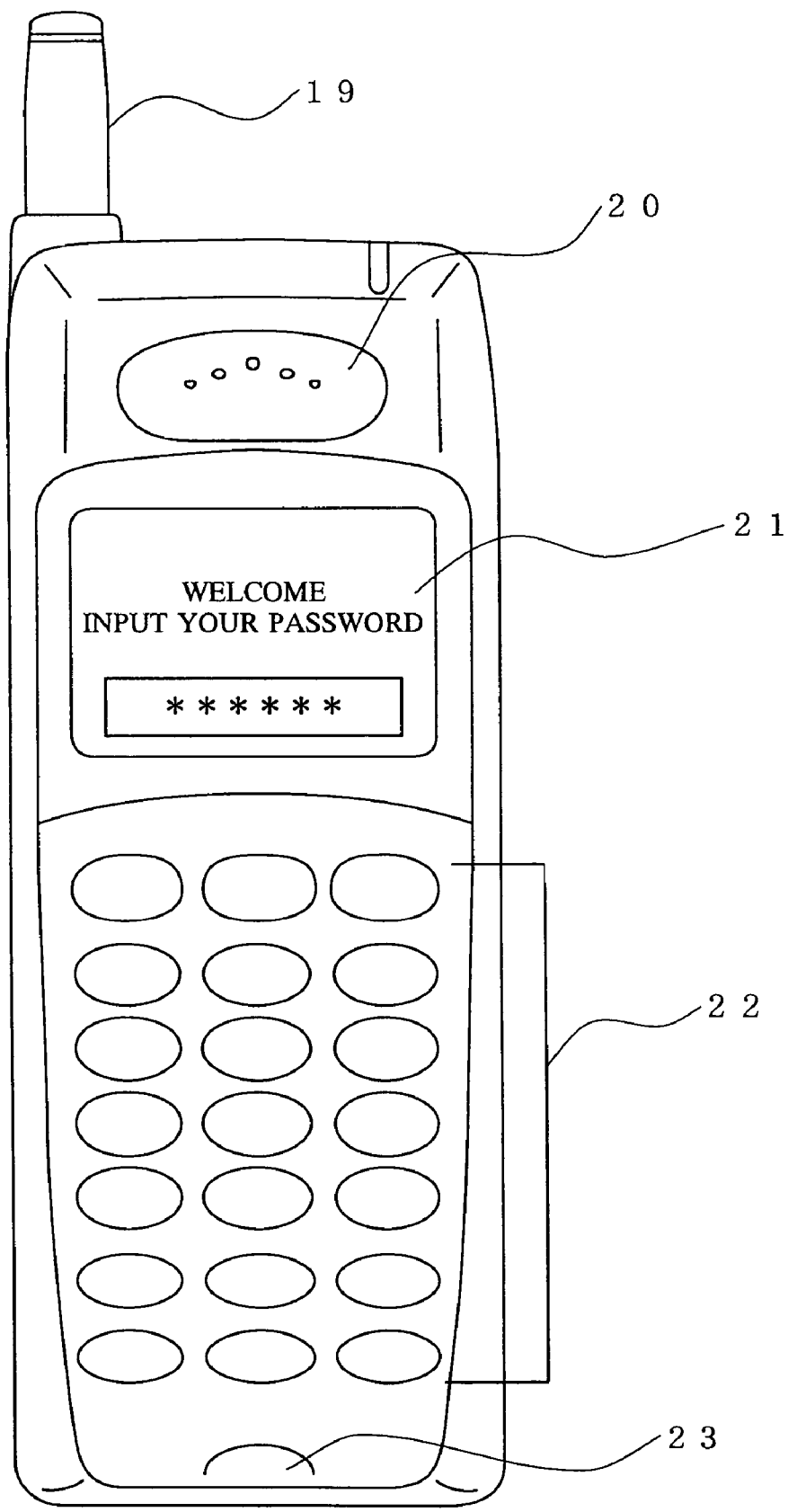
FIG. 2 is a diagram showing one example of the appearance of a mobile phone.

FIG. 2 is a diagram showing an example of the appearance of the mobile phone 7. The mobile phone 7 comprises: a phone antenna 19; speaker 20; a display 21; a keyboard 22; and a microphone 23.

The phone antenna 19 is an antenna for radio communication with the base station 5.

The speaker 20 is a device for converting an electrical signal and generating sound. In the call mode, sound generated by a call partner is outputted. In the application mode, sound data-sent from the server device is reproduced.

The display 21 is a display device for displaying characters and an image, such as a liquid crystal display or a plasma display.

In the call mode, the display 21 displays call information on the call including a receiving state of radio waves, a phone number inputted by the user, or a phone number of the call partner.

In the application mode, the display 21 displays a screen provided by the application.

In the access to the Internet, a screen using screen data sent by the server device is displayed.

In the off-line, various screens, such as a game screen, provided by the application are displayed. For example, the balance or history of value stored in the electronic-money function unit 12 is displayed.

The keyboard 22 comprises a character key for inputting character information of numerals and characters and a function key. The function key is a key having assigned specific functions for turning on/off the mobile phone 7, switching the call mode and the application mode, or moving a cursor displayed on the exposing device 21, and clicking a button displayed on the display 21.

The user presses the key of the display 21 to perform various operations, thereby inputting a URL (Uniform Resource Locators) on a desired Web site, inputting information in an input column displayed on the screen, and selecting an item displayed on the screen.

With the above function, the URL of a service site (Web site for providing the service on the electronic money) of the electronic-money server 2 is inputted or the install operation of the value processing function is selected on the screen provided by the service site, thereby installing the value processing function to the mobile phone 7.

The microphone 23 is a device for obtaining sound and converting the sound into an electronic signal. The user inputs the sound from the microphone 23.

Next, a description is given of the value processing of the various functions provided for the mobile phone 7.

The functions of the mobile phone 7 are different from the state before installing the value processing function and the state after the install operation. First, a description is given of the functional structure before installing the value processing function with reference to FIG. 3.

Figure 3:
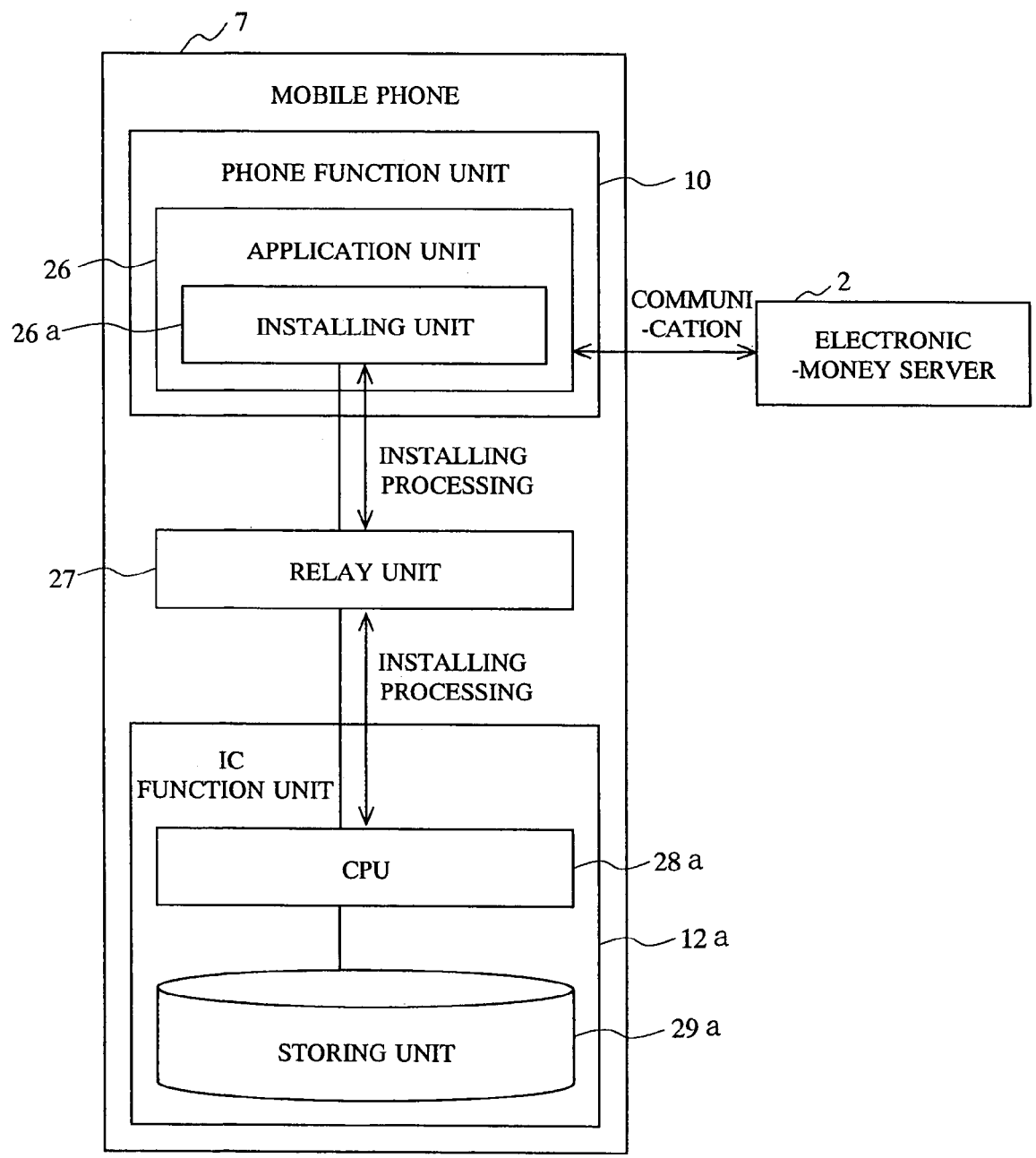
FIG. 3 is a diagram for explaining a function of the mobile phone before installing the value processing function.

FIG. 3 is a diagram showing the functional structure of the mobile phone 7 before installing the value processing function.

Referring to FIG. 3, before installing the value processing function, the electronic-money function unit 12 shown in FIG. 1 is referred to as an IC function unit 12*a*.

As will be described later, the phone function unit 10 and the IC function unit 12*a* comprise CPUs (Central Processing Units). The CPUs execute predetermined programs, thereby enabling the function units to operate like software.

Referring to FIG. 3, the IC function unit 12*a* comprises a central processing unit 28*a* (information processing means) and a storing unit 29*a* (storing means).

Although not shown, the IC function unit 12*a* has the identical function as that of an antenna (hereinafter, referred to as a terminal antenna) for communication between a non-contact IC card and the electronic-money terminal 8, and accesses a terminal for the non-contact IC card, such as the electronic-money terminal 8.

The storing unit 29*a* is writable and readable and stores a plurality of pieces of programs data.

At the time of sale of the mobile phone 7 to the users, a basic program for operating the IC function unit 28*a* is installed to the storing unit 29*a*.

The above-mentioned basic program includes an OS (Operating System) for input/output processing of a file, and control of the IC function unit 12a, or a communication program for radio communication of the IC function unit 12a with a terminal for non-contact IC card.

The central processing unit 28a is a function unit for executing a predetermined program, performing the calculation, controlling the entire IC function unit 12a, and executing information processing such as input/output of data.

The central processing unit 28a reads a program or data from the storing unit 29a or the application unit 26. Further, the central processing unit 28a receives, by wireless manner, a program or data from a terminal for non-contact IC card via a terminal antenna, and reads the received program or data.

An install program is read to the central processing unit 28a, and is executed, thereby installing application programs to the storing unit 29a. The install program is provided for each application program.

The central processing unit 28a executes the install program and then ensures an area for installing the application program in the storing unit 29a (when the application program for install is known in advance, the area for the program is ensured in advance).

After formatting the ensured area to match the data format of the application program, the application program is written to the area.

After installing the application program to the storing unit 29a, the application program is read to the central processing unit 28a, and is executed.

According to the embodiment, the application program (hereinafter, value processing program) is installed to the storing unit 29a, and the central processing unit 28a realizes the value processing function.

The relay unit 27 is a function unit (interface) for relaying the communication between the phone function unit 10 and the IC function unit 12a. In the relay of communication between the phone function unit 10 and the IC function unit 12a, the relay unit 27 encrypts the data to be sent to the phone function unit 10, or decrypts the encrypted data to be sent to the IC function unit 12a by the phone function unit 10.

This is because the data the phone function unit 10 receives and transmits to/from the electronic-money server 2 are encrypted/decrypted, thereby improving the security.

The electronic-money server 2 comprises: means for combining the data received from the phone function unit 19; and means for encrypting the data sent to the mobile phone 7.

When the communication format of the phone function unit 10 is different from that of the IC function unit 12a, the communication format can be converted.

This is because, for example, there could be a case in which the IC function unit 12a communicates data in the same communication format of the non-contact IC card, while the phone function unit 10 uses the communication format on the Internet 4 and the communication format needs to be converted to access the IC function unit 12a from the phone function unit 10.

The application unit 26 is a function unit for providing various applications by the mobile phone 7.

The application unit 26 provides an Internet access function for connecting the mobile phone 7 to the Internet 4, a using function of the IC function unit for using application programs installed in the IC function unit 12a, and a service providing function for providing various services such as a game or calendar.

In the case of providing the Internet access function, the application unit 26 receives the input of URL and accesses the mobile phone 7 to a Web site specified by the URL. Further, the application unit 26 reproduces information (image information, character information, and sound information) sent by the site in the access destination and sends the information from the mobile phone 7 to a site in the access destination and thus functions as a browser.

The application unit 26 has an installing unit 26a (installing means and generating means) for supporting the install operation of the value processing program (money information processing program) to the IC function unit 12a by the electronic-money server 2.

The installing unit 26 communicates with the central processing unit 28a and the electronic-money server 2 and simultaneously installs (incorporates) the value processing program to the storing unit 29a.

Specifically, the installing unit 26 operates cooperatively with the electronic-money server 2, and sends, to the central processing unit 28a, a program for installing the value processing program. The central processing unit 28a executes the sent program, thereby installing the value processing program to the storing-unit 29a.

The program to be installed may be downloaded from the electronic-money server 2 at the install time, or may be provided for the installing unit 26a in advance.

In the case of installing the value processing program, the installing unit 26a receives information necessary for executing the value processing program including key information (identification information used for identifying the mobile phone 7 by the electronic-money terminal 8), which will be described later, and an electronic-money ID (registered ID information) from the electronic-money server 2, and stores the information to the storing unit 29a. In addition, the installing unit 26a sends, to the electronic-money server 2, the information necessary for providing the electronic-money service by the electronic-money server 2, such as an IC chip ID of the IC chip forming the IC function unit 12a.

Figure 4:
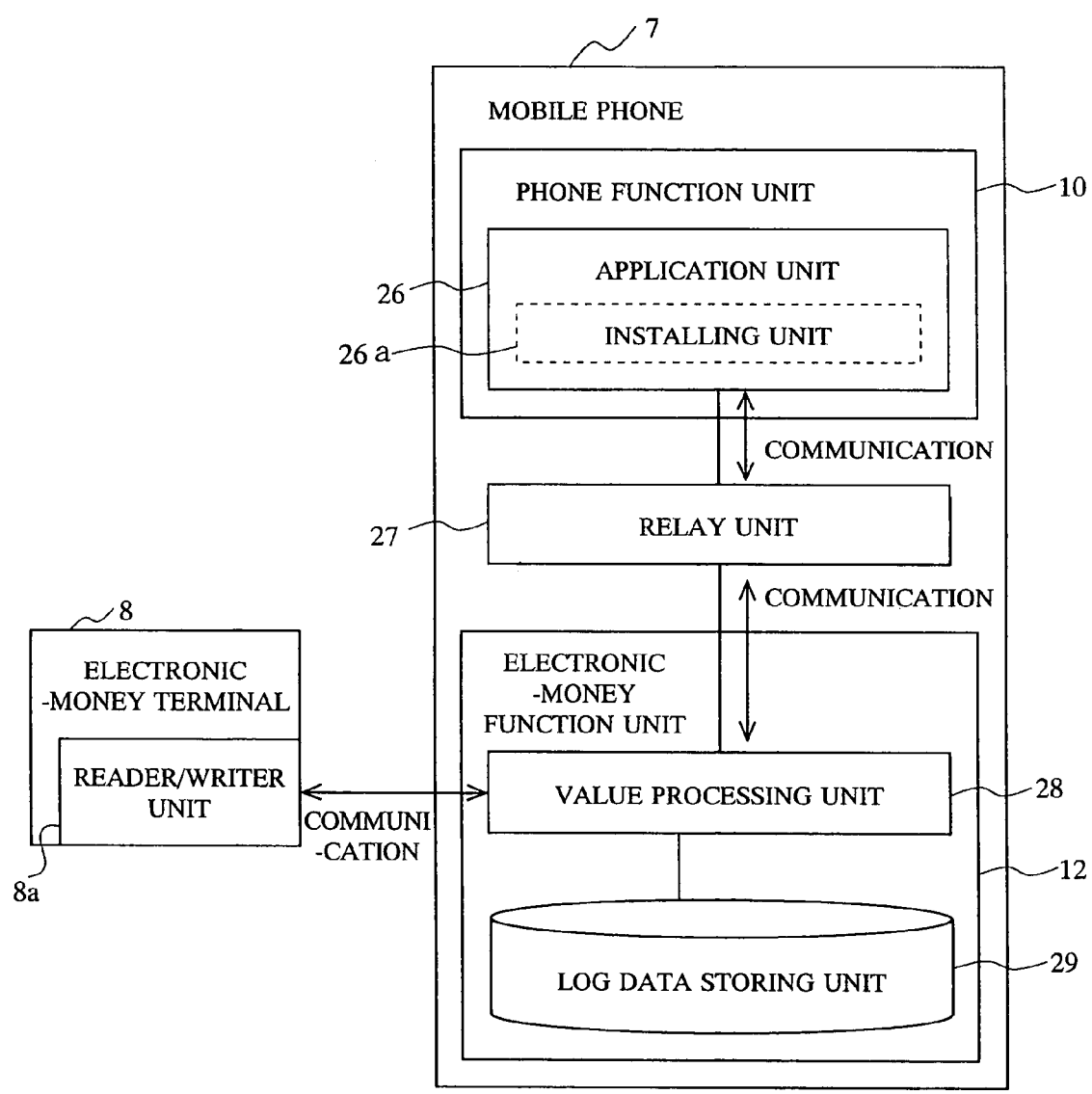
FIG. 4 is a diagram for explaining the function of the mobile phone after installing the value processing function.

Next, using FIG. 4, a description is given of the functional structure of the mobile phone 7 after installing the value processing function to the IC function unit 12a.

Referring to FIG. 4, the IC function unit 12a executes the value processing program, thereby generating, to the IC function unit 12a, the electronic-money function unit 12 comprising the value processing unit 28 and the log data storing unit 29 (money information storing means).

Incidentally, the value processing program may be always executed. Or, upon installing another program to the IC function unit 12a, the corresponding application program may start if necessary.

The log data storing unit 29 is a function unit for storing log data on the value. Upon executing the value processing, such as the writing of value, subtraction, and reference of balance, the log data is history information for recording the processing contents. By referring to the log data, the current balance stored in the mobile phone 7 or the history of the value processing can be known.

The contents recorded as the log data are the informations such as the date and time of a processing, the type of the processing, the value of change (e.g., the amount of money corresponding to the value upon writing the value or the amount of money corresponding to the subtracted value upon subtracting the value) if the amount of money corresponding to the value is changed by the processing, the terminal ID of the electronic-money terminal 8 for accessing and processing the value, and the current value balance.

Incidentally, the application unit 26 may access the information and may display the information on the display 21.

The value processing unit 28 communicates with the electronic-money terminal 8 or the application unit 26 (money-amount information receiving function), and executes the value processing (money information processing function) stored in the log data storing unit 29.

As will be described later, the electronic-money terminal 8 has the reader/writer unit 8a having an antenna for radio communication with the electronic-money card 15. The mobile phone 7 is close to the electronic-money terminal 8 by the setting and the value processing unit 28 thus communicates with the reader/writer unit 8a by radio waves.

Via the application unit 26 and the relay unit 27, the electronic-money server 2 communicates with the value processing unit 28 and thus the value processing unit 28 executes the value processing.

As mentioned above, the value processing unit 28 communicates with the electronic-money terminal 8, the application unit 26, and the electronic-money server 2.

The value processing unit 28 receives the input of a command, and executes information processing specified by the command.

Various types of commands are provided, e.g., including a write command for adding the value, a subtract command for subtracting the value, and a balance reference command for referring to the balance of value.

The commands are inputted from the electronic-money terminal 8, the application unit 26, and the electronic-money server 2.

However, the command inputted only by the application unit 26 is, e.g., the balance reference command in which the amount of money corresponding to the value is not changed.

Upon executing the processing for changing the amount of money corresponding to the value, the correspondence to the actual money is necessary. Therefore, it is prevented that only the value is increased/reduced irrespective of an electronic-money carrier.

The command which changes the amount of money forms money-amount changing information.

The write command includes, as attachments, the information on the value writing processing, such as the written amount of money, terminal ID, date and time for processing, and a group shop ID for specifying a group shop as parameters. The write command is inputted to the value processing unit 28 and then the value processing unit 28 updates the log data of the log data storing unit 29. Further, the value processing unit 28 performs the addition for adding the value of the amount of money designated by the parameter to the current balance. The addition is executed, thereby charging the value.

The subtract command has, as attachments, the information on the settlement including the amount of money of the subtracted value, terminal ID, date and time for processing, and a group shop ID, as parameters. The subtract command is inputted to the value processing unit 28 and the value processing unit 28 thus updates the log data of the log data storing unit 29. Further, the value processing unit 28 performs the subtraction for subtracting the value of the amount of money designated by the parameter from the current balance. By executing the subtraction, the settlement (payment) using the value is performed.

The balance reference command is a command for obtaining the current balance of value. The balance reference command is inputted to the value processing unit 28 and the value processing unit 28 thus searches for the log data in the log data storing unit 29, thereby returning the current balance of the value.

The display 21 displays the current balance returned by the value processing unit 28, thereby sending a notification indicating the current balance to the user.

Further, various commands for operating the value processing unit 28 are provided. For example, the command for operating the value processing unit 28 includes a read command for reading the IC chip ID of the IC chip forming the electronic-money function unit 12, a read command of the electronic-money ID, and a send command of key information for identification to the electronic-money terminal 8.

The relay unit 27 relays the communication between the application unit 26 and the electronic-money function unit 12.

The application unit 26 inputs various commands to the value processing unit 28 via the relay unit 27, similarly to the electronic-money terminal 8. In this case, the relay unit 27 has the same function as that of the reader/writer unit 8a.

The communication between the electronic-money terminal 8 and the electronic-money function unit 12 is encrypted.

The application unit 26 accesses the value processing unit 28 via the relay unit 27. The application unit 26 inputs various commands to the value processing unit 28, thereby operating the value processing unit 28 without changing the balance of value (balance reference) and is further connected to the electronic-money server 2, thereby intermediating the communication with the electronic-money server 2 and the value processing unit 28 together with the relay unit 27.

As mentioned above, the method for communication with the value processing unit 28 includes the case of radio communication from the electronic-money terminal 8 and the case of communication via the relay unit 27.

Therefore, a write command or subtract command is inputted to the value processing unit 28 from the electronic-money terminal 8, and the settlement is performed by charging the value or settlement using the value. The command is inputted to the value processing unit 28 from the electronic-money server 2 via the application unit 26. Then, the value is charged on the Internet 4 or the settlement using the value is performed.

Figure 5:
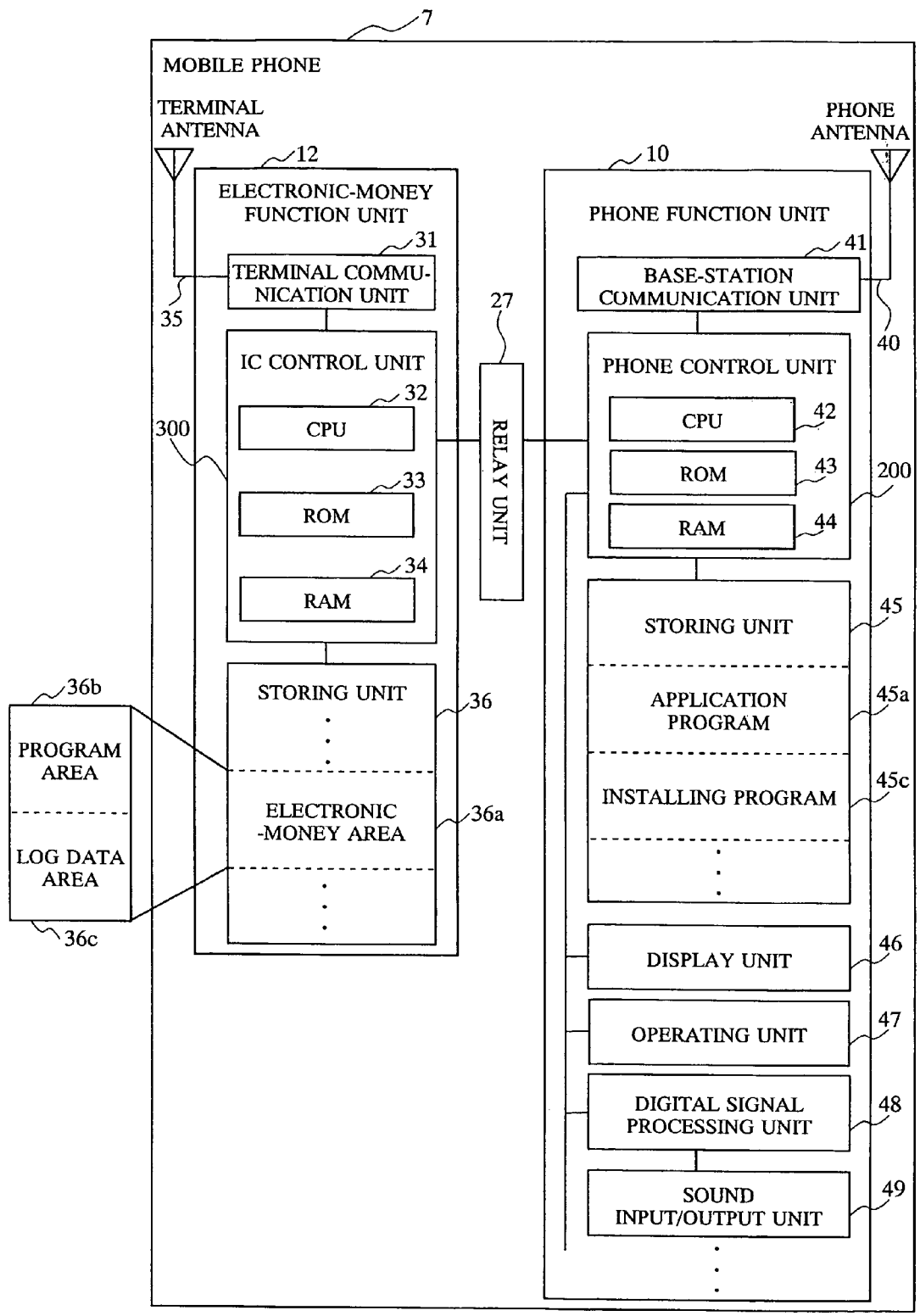
FIG. 5 is a diagram for explaining one example of the hardware structure of the mobile phone.

Next, a description is given of one example of hardware structure of the mobile phone 7 with reference to FIG. 5. FIG. 5 shows the structure after installing the value processing function.

The phone function unit 10 forms a digital mobile phone having a function for access to the Internet 4, and comprises: a phone antenna 40; a base station communication unit 41; a phone control unit 200; a storing unit 45; a display unit 46; an operating unit 47; a digital signal processing unit 48; and a sound input/output unit 49.

The phone antenna 40 radiates the electric waves to the base station 5 or absorbs the electric waves radiated by the antenna of the base station 5. Thus, the mobile phone 7 communicates by radio waves with the base station 5, and has a phone call via the base station 5 and accesses the Internet 4.

The base station communication unit 41 (secret information receiving means and ID information receiving means) drives the phone antenna 40, and amplifies a signal sent from the phone antenna 40 or amplifies a signal received from the base station 5, thereby providing the signal to the phone control unit 200.

The phone control unit 200 comprises: a CPU 42; a ROM (Read Only Memory) 43, and a RAM (Random Access Memory) 44.

The CPU 42 is a central processing unit for executing a predetermined program and performing various information processing, and exhibits a function, as a mobile phone having the Internet access function of the phone function unit 10.

The CPU 42 executes the program stored in the ROM 43, RAM 44, or storing unit 45, thereby functioning as a mobile phone or as a terminal of the Internet 4. Further, the CPU 42 accesses the electronic-money function unit 12 via the relay unit 27.

The ROM 43 is a read-only memory arranged to be readable by the CPU 42, and stores a program or parameter executed by the CPU 42.

The ROM 43 stores, for example, an OS, as a basic program, for operation of the CPU 42.

The RAM 44 is a readable/writable memory for providing a working area to the CPU 42 upon operating the CPU 42.

The storing unit 45 stores a program or data used by the CPU 42. The storing unit 45 is a readable/writable memory of the CPU 42. For example, the storing unit 45 is a flash memory or EEPROM (Electrically Erasable and Programmable ROM).

According to the embodiment, the storing unit 45 comprises: an application program 45*a* for enabling the CPU 42 to realize the application function; and an installing program 45*c* for assisting the install operation of the value processing function by the electronic-money server 2.

The CPU 42 executes the application program 45*a* and the installing program 45*c*, thereby structuring software of the application unit 26 (refer to FIG. 3) and the installing unit 26*a*.

In addition, the storing unit 45 stores a phone No. and an email address registered by the user, a KANA and KANJI converting program, and another information (not shown).

The display unit 46 is a function unit for displaying character information and an image on the display 21 (refer to FIG. 2).

The display unit 46 selectively displays a list of phone No. registered by the user in the call mode, and further displays information for call, such as the strength of electrical waves sent from the base station 5, phone No. inputted by the user, or phone No. of partner's phone No. which calls.

In the application mode an application screen provided by the application program 45*a* is displayed, and an input column of URL, a screen sent by the server device, and an email are displayed. Further, the balance of value is displayed.

The operating unit 47 comprises the keyboard 22 for converting the user's key operation to an electrical signal and inputting the converted signal to the CPU 42.

The sound input/output unit 49 comprises: the microphone 23 and the speaker 20, converts sound received via the microphone 23 into an analog signal or converts the analog signal to sound, and outputs the sound from the speaker 20.

A user's voice from the microphone is converted into an electrical signal, and the voice is inputted to the phone function unit 10. Further, the sound signal outputted from the phone function unit 10 is converted into sound and is listened via the speaker.

The digital signal processing unit 48 is a function unit for converting an analog signal of the sound data into the digital signal or converting the digital signal into the analog signal fast, and comprises, e.g., a DSP (Digital Signal Processor). Further, the digital signal processing unit 48 compresses or decompresses the sound data.

The microphone and the speaker use an analog signal. On the other hand, other function units of the phone function unit 10 use a digital signal. Then, upon inputting the sound signal, the digital signal processing unit 48 converts the analog signal outputted from the microphone and further compresses the converted signal. Upon outputting the sound signal, the digital signal processing unit 48 decompresses the digital signal outputted by the phone function unit 10 and outputs the converted analog signal via the speaker.

The electronic-money function unit 12 comprises: a terminal antenna 35; a terminal communication unit 31; an IC control unit 300; and a storing unit 36. Among the components, the components excluding the terminal antenna 35 are accommodated on one IC chip.

The IC control unit 300 and phone control unit 200 are connected via the relay unit 27.

According to the embodiment, the mobile phone 7 includes the electronic-money function unit 12. However, the present invention is not limited to this, and the electronic-money function unit 12 may be detachable to the mobile phone 7.

The terminal antenna 35 communicates with an antenna arranged to the reader/writer unit 8*a* of the electronic-money terminal 8 by electrical waves.

The terminal communication unit 31 drives the terminal antenna 35, and further amplifies a signal for reception and transmission.

The IC control unit 300 comprises: a CPU 32; a ROM 33; and a RAM 34.

The CPU 32 is a central processing unit for executing the value processing by executing programs stored in the ROM 33, RAM 34, and storing unit 36.

The ROM 33 is read-only memory arranged to be readable by the CPU 32. The ROM 33 stores, for example, an OS, as a basic program for operating the CPU 32.

At the manufacturing step of the IC chip, a specific IC chip ID is assigned to the IC chip, and is stored in the ROM 33.

The IC chip ID is not changed after shipping to the factory and, generally, is not read by a user.

The RAM 34 is a readable/writable memory for proving a working area for the CPU 32 upon operating the CPU 32.

The storing unit 36 comprises, for example, a flash memory or EEPROM, and is a storage medium arranged to be readable/writable by the CPU 32. The storing unit 36 stores an application program or another data.

The storing unit 36 ensures an electronic-money area 36*a* for value management. The electronic-money area 36*a* is formed so that the application unit 26*a* installs the value processing function to the electronic-money function unit 12.

The electronic-money area 36*a* comprises a program area 36*b* for storing the program and a log data area 36*c* for storing the log data.

A value processing program for enabling the CPU 32 to realize the value processing function is installed to a program area 36*b*. The CPU 32 executes the value processing program, thereby structuring the software of the value processing unit 28 and the log data storing unit 29 (refer to FIG. 4).

The program area 36*b* stores the key information and the electronic-money ID sent from the electronic-money server 2, upon installing the value processing function by the installing unit 26*a*.

The log data area 36*c* stores log data on the value processing, and forms a log data storing unit 29 (refer to FIG. 4).

The application program in the storing unit 36 includes value processing program and a season-ticket program functioning as a commuting season-ticket (for passage in the station by the setting of the mobile phone 7 at the ticket gate), and the application programs are selectively driven.

As mentioned above, the mobile phone 7 has the value processing function and therefore the user not only sets the mobile phone 7 to the electronic-money terminal 8, thereby charging the value or settling the money by using the value, but also uses the electronic-money server 2, thereby charging the value or settling the money by using the value.

Next, a description is given of the Internet 4, the base station 5, and the phone line network 6 (refer to FIG. 1).

The Internet 4 connects the various server device and terminals, and communicates data by using TCP/IP (Transmission Control Protocol/Internet protocol) or another protocol.

The Internet 4 generally uses the packet communication. In the packet communication, the data is divided based on the unit of packet and is sent. The packet has, as attachment, sending-destination specifying information for specifying the sending destination and restoring information for restoring the original data from the packet on the sending destination as a header.

The data reception side structures the packet and restores the original data.

Although not shown, various server devices are connected to the Internet 4. A Web site for providing various services is opened to the server devices. The Web site is specified by URL.

The email is received or sent via the Internet 4. An email account, as the sending destination of the email is specified by an email address.

The email sends and receives not only character data but also image data, program, and another data as attachment.

The base station 5 communicates with the mobile phone 7 by radio waves, and provides call service or the Internet access service for the user of the mobile phone 7.

When the user accesses the base station 5 from the mobile phone 7 in the call mode, the base station 5 sets the line to the phone line network 6 for a call operation. When the user accesses the base station 5 in the application mode, the base station 5 sets the operation for using the service provided by the Web server by the access to the Internet 4.

Referring to FIG. 1, the Internet 4 and the phone line network 6 are independently arranged. The independent arrangement is used in functional view, and the Internet 4 and the phone line network 6 comprise a physically common transfer medium.

As the transfer medium, various cables, optical fiber, and a line via an artificial satellite are used.

Next, a description is given of the electronic-money server 2 (refer to FIG. 1).

Figure 6:
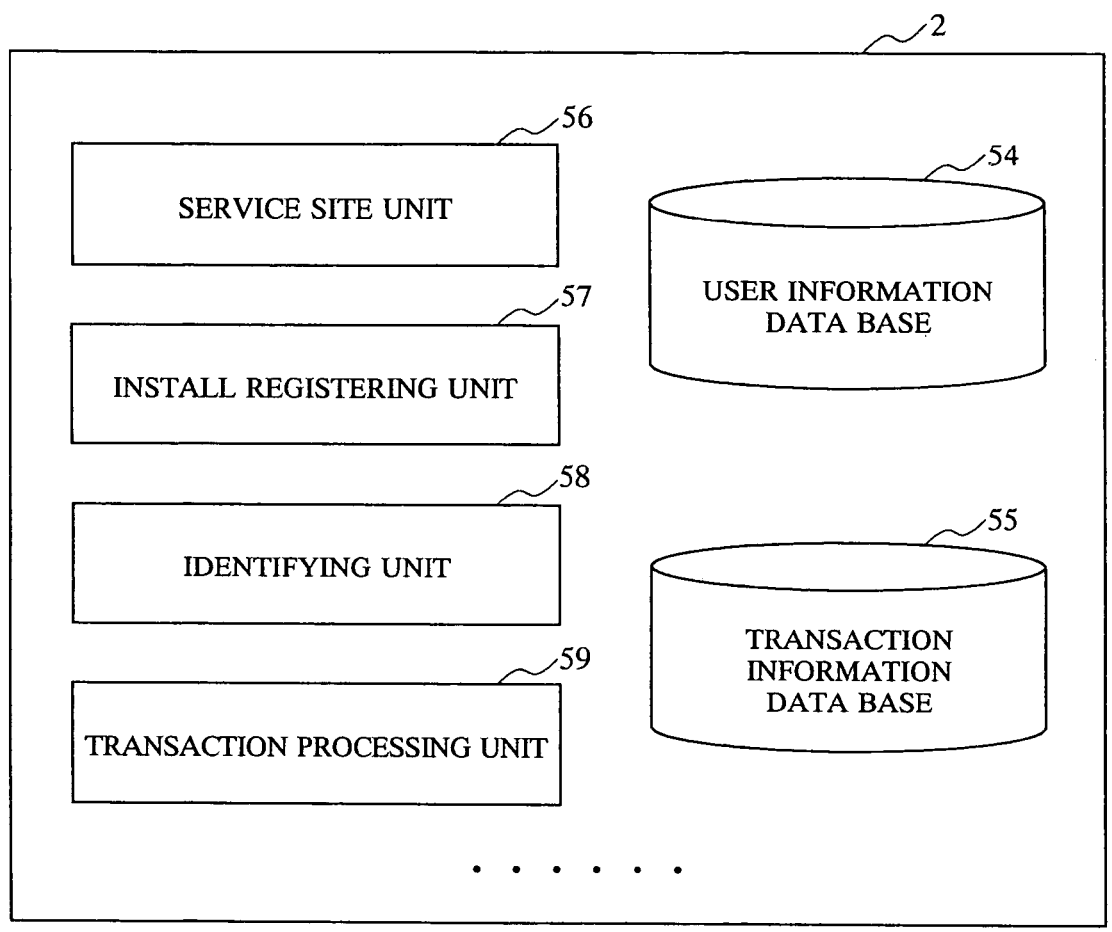
FIG. 6 is a diagram for explaining one example of the functional structure of an electronic-money server.

FIG. 6 is a conceptual diagram showing one example of the functional structure of the electronic-money server 2 (providing server device). The electronic-money server 2 accesses the Internet 4 via an Internet line, and further is connected to the electronic-money terminals 8, 8, 8 . . . .

The electronic-money server 2 comprises: a service site unit 56; an install registering unit 57; an identifying unit 58; a transaction processing unit 59; various function units; a user information database 54; a transaction information database 55; and other various databases.

According to the embodiment, the electronic-money server 2 provides the service by using the electronic money. However, the present invention is not limited to this and may use a system obtained by combining a plurality of server devices.

For example, the service of the electronic-money server 2 may be provided by combining server devices of a Web server which opens the service site for electronic money, an identifying server for identifying the user, a transaction processing server for transaction processing, and an installing server for installing the value processing function.

The service site unit 56 is a function unit which operates the Web site on the service of the electronic money on the Internet 4.

The user inputs the URL of the service site from the mobile phone 7 or another terminal, thereby accessing the service site and thus using various services provided by the service site.

The user accesses the service site and the electronic-money server 2 sends screen data on displaying a main menu screen on the mobile phone 7. The main menu screen selectably displays items of the service provided by the service site, and the user selects a desired item.

Various service items are provided, for example, including not only regarding use of electric money, such as, user registration, change in user registration information, charge of value, and settlement using the value, but also new presentation of campaign, reception of customer's inquiry etc.

Upon registering the user, the value processing function is simultaneously installed.

The install registering unit 57 is a function unit which performs processing of the user registration information and the install operation of the value processing function such as the user registration, the install operation of the value processing function to the mobile phone 7, deletion of registration, and change in registration contents etc.

Further, the install registering unit 57 starts when the user selects the item on the user registration information, such as the user registration or change in user registration information on the main menu screen.

Here, a description is given of the case of new user registration. The user selects the user registration on the main menu screen and then the install registering unit 57 sends screen data for displaying a registering screen to the mobile phone 7.

The registering screen has a column for inputting the registration information, such as user name, password, and issuer. The user inputs the information to the column and sends the information to the electronic-money server 2.

The install registering unit 57 stores the information to the user information database 54, and shifts to the installing processing of the value processing function. Incidentally, the use clause is presented to the user before the installing processing of the value processing function, the user accepts the clause, and then the installing processing may be performed. When the installing processing is not accepted, it can be performed later.

The install registering unit 57 performs the installing processing together with the installing unit 26a (refer to FIG. 3). First, the install registering unit 57 receives the IC chip ID from the mobile phone 7, and stores the IC chip ID to the user information database 54. The IC chip ID is read by the application unit 26a from the IC function unit 12a.

The electronic-money ID is used and is sent to the mobile phone 7. Further, the electronic-money ID is stored in the user information database 54.

The install registering unit 57 has the key information or other secret information necessary for ensuring security, and sends the secret information and necessary data to the mobile phone 7.

When a program for installing the value processing program is sent to the mobile phone 7 from the electronic-money server 2, the program is sent to the mobile phone 7. When the mobile phone 7 has the program in advance, the program is not sent.

Figure 7:
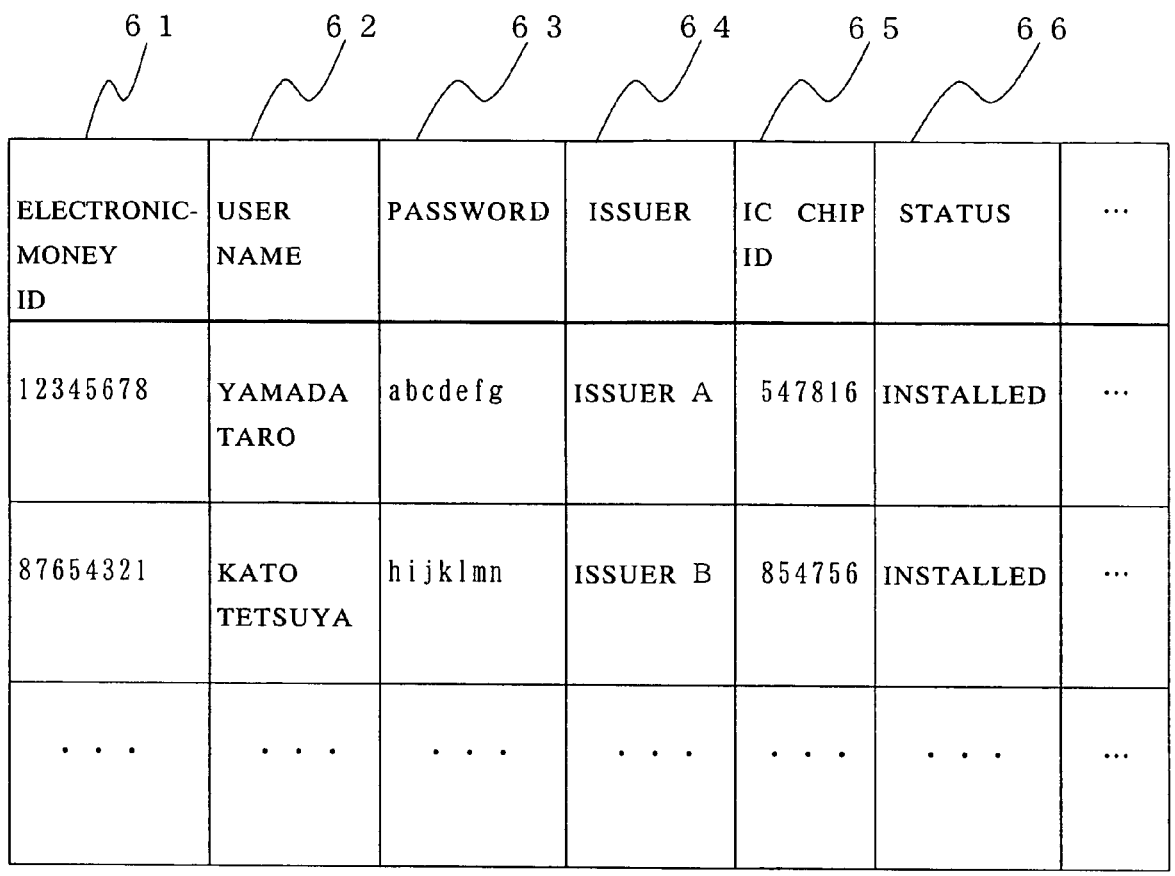
FIG. 7 is a diagram showing one example of the logical structure of user information.

FIG. 7 is a diagram showing an example of the logical structure of user information stored in the user information database 54.

The user information comprises an electronic-money ID 61, a user name 62, a password 63, an issuer 64, an IC chip ID 65, a status 66, etc.

The electronic-money ID 61 is an electronic-money ID issued by the install registering unit 57 upon installing the value processing function to the mobile phone 7.

Although not shown, the electronic-money server 2 has a numbering table for numbering the electronic-money ID, and the electronic-money ID 61 is numbered from the table by the install registering unit 57.

The user name 62 is a name inputted on the registration screen by the user.

The password 63 is information for confirming whether or not the user who uses the service is the real user, and is set by the user in the user registration.

The issuer 64 is information for specifying by which issuer issues the value upon charging the value from the electronic-money server 2 via the Internet 4, and is selected from a plurality of issuers by the user in the user registration.

Although not shown, the electronic-money server 2 has an issuer master for registering the issuer, and the user selects the issuer from the issuer master.

Incidentally, the issuer denotes an issuer which issues the value, and a plurality of issuers exist for the reason of the business operation. Further, the issued value is used by any electronic-money terminal 8, irrespective of the issuer.

The IC chip ID 65 is set to the electronic-money server 2 from the mobile phone 7 upon installing the value processing function.

According to the embodiment, as mentioned above, the IC chip ID is registered and therefore the user is registered from the mobile phone 7. When the IC chip ID is not registered, the user is registered from another terminal other than the mobile phone 7.

The status 66 sets statuses "non-installed" and "installed" to the users.

Until the install registering unit 57 receives the user registration and the ends the installing processing, the install registering unit 57 sets the status as "non-installed". Upon ending the installing processing, the install registering unit 57 updates the status to "installed".

Referring back to FIG. 6, the identifying unit 58 is a function unit for identifying the user when the registered user uses the service site.

The service provided by the service site unit 56 includes the service which does not need the identification and the service which needs the identification. The user receives the identification and then receives the service which needs the identification.

The identifying unit 58 sends, to the mobile phone 7, screen data for inputting the password (to display a password input screen as shown in FIG. 2), and receives the password, the IC chip ID, and the electronic-money No. inputted by the user from the mobile phone 7.

The information is checked to the information stored in the user information database 54. When the information matches the information stored in the user information database 54, the user is identified as a regular user.

The above-mentioned identification specifies the user, thereby providing the service specific to the user.

The user identification does not need all of the password, IC chip ID, and electronic-money ID. At least one of the password, IC chip ID, and electronic-money ID is used for identification.

The transaction processing unit 59 is a function unit for recording the transaction recording of users to the transaction information database 55.

The transaction processing unit 59 records, to the transaction information database 55, the charge processing, settlement, and another processing performed by the mobile phone 7 or electronic-money card 15.

FIG. 8 is a diagram showing one example of the logical structure of the transaction information stored in the transaction information database 55.

The transaction information comprises an electronic-money ID 67, charge recording 68, and settlement recording 69.

The charge recording 68 records the ID information of the terminal which performs the charge operation, the charge date, and the amount of money of the charged value.

The electronic-money ID 67 is read from the mobile phone 7 (or electronic-money card 15) by the electronic-money terminal 8. In the communication with the electronic-money server 2 via the Internet 4, the electronic-money ID 67 is read from the mobile phone 7 by the electronic-money server 2.

For example, recording 71 records the IC chip ID at the first row in FIG. 7, as a terminal ID. As mentioned above, in the case of the charging the value from the electronic-money server 2 via the Internet 4, the IC chip ID of the mobile phone 7 which charges the value is recorded.

Recording 72 indicates that the electronic-money terminal 8 specified by a terminal ID "347895" charges the value corresponding to 3,000 yen.

The settlement recording 69 comprises: a terminal for settlement; date and time for settlement; and value of the amount of money for settlement. For example the recording 73 indicates that the electronic-money terminal 8 specified by a terminal ID "2547657" settles the value corresponding to 2,000 yen.

In the value settlement using the electronic-money server 2 via the Internet 4, the IC chip ID of the mobile phone 7 is recorded as a terminal ID.

The transaction information stored in the transaction information 55 is analyzed, thereby distributing the cash collected from the issuer to the shop which settles the money by the value, and the illegal electronic-money card 15 is monitored to collect the information used for business. In addition, the product purchased by the user is simultaneously recorded, thereby performing the data mining, such as market research.

Incidentally, the transaction processing unit 59 does not necessarily perform the information processing in real time. The electronic-money terminal 8 stores the transaction information and updates the transaction information database 55 by receiving the transaction information later. Therefore, the electronic-money operating system 1 performs the processing fast without accessing the electronic-money server 2 in the charge operation or settlement at the shop.

According to the embodiment, in the electronic-money operating system 1, the value used for the settlement is stored in the mobile phone 7 or electronic-money card 15. The electronic-money server 2 manages the transaction information thereof.

Therefore, the electronic-money server 2 is not accessed in real time in the settlement using the value, and processes the value soon and on site. In addition, the transaction information is temporarily stored in the storage device of the electronic-money terminal 8, and is transferred to the electronic-money server 2 after a predetermined period, or the storage medium for storing the transaction information is collected by a person in charge.

Next, a description is given of one example of the hardware structure of the electronic-money server 2 (refer to FIG. 1).

Figure 9:
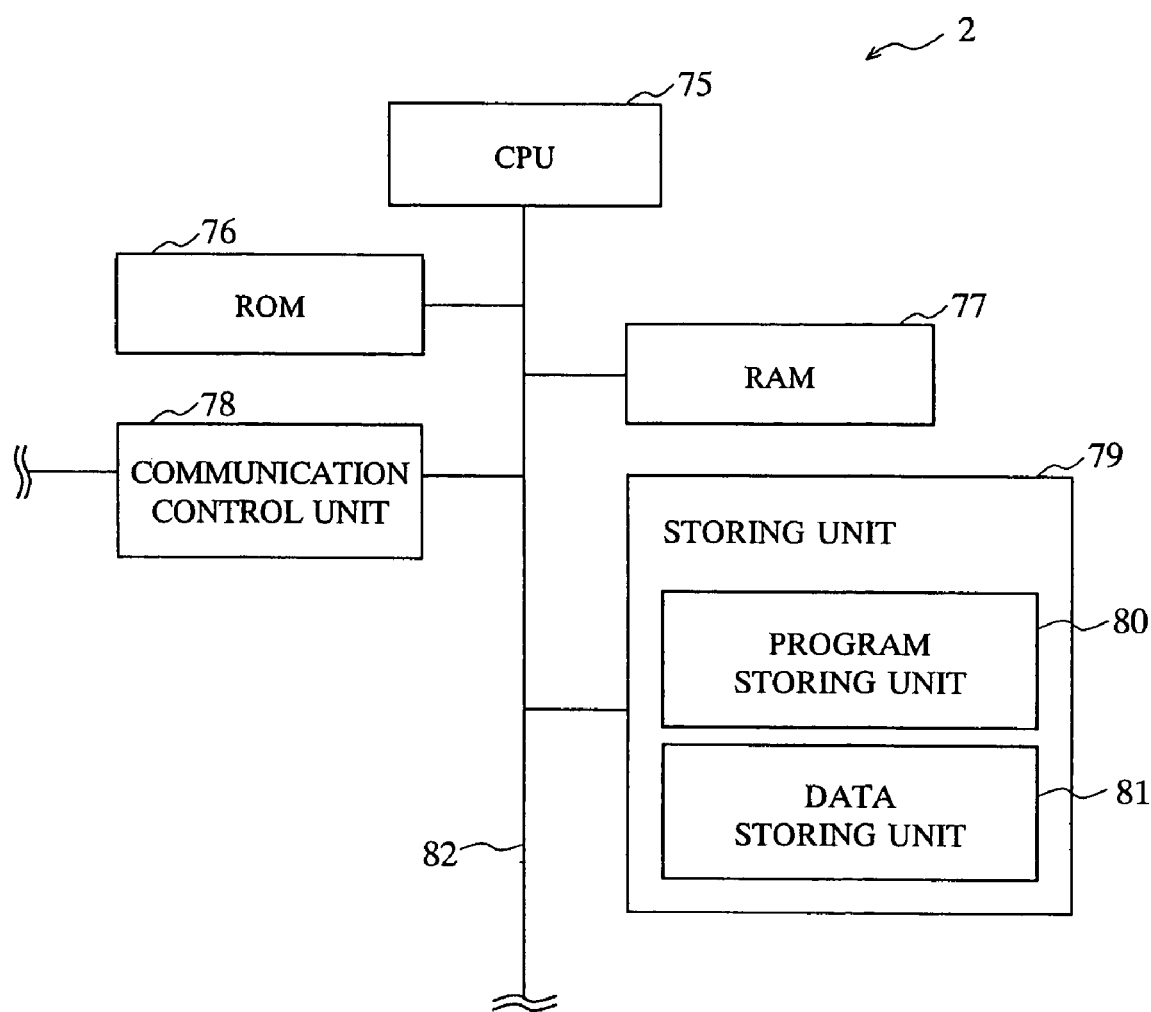
FIG. 9 is a diagram showing one example of the hardware structure of the electronic-money server.

As shown in FIG. 9, the electronic-money server 2 comprises: the CPU 75, ROM 76, RAM 77, communication control unit 78; and storing unit 79 which are connected by the bus line 82.

The CPU 75 performs information processing in accordance with a predetermined program and controls the entire electronic-money server 2.

The ROM 76 is a read-only memory, and stores basic program or parameter for operating the electronic-money server 2.

The RAM 77 is readable/writable memory, and provides a working memory of the CPU 75 or loads and stores the program or data stored in the storing unit 79.

The communication control unit 78 (receiving means and sending means) is a function unit for communicating with the mobile phone 7 via the Internet 4 or base station 5, or communicating with the electronic-money terminal 8 via a communication line.

The CPU 75 receives the information on the transaction using the electronic-money card 15 or mobile phone 7 from the electronic-money terminal 8 via the communication control unit 78, and communicates with the mobile phone 7 and charges the value to the mobile phone 7 or performs the settlement by using the value in the mobile phone 7.

The storing unit 79 is a hard disk or a non-volatile memory, and comprises a program storing unit 80 for storing various programs and a data storing unit 81 for storing data.

The program storing unit 80 stores an OS, serving as a basic program for functioning the electronic-money server 2, a service site program for operating the service site, registering program for registering the user or installing the value processing function, an identification program for identifying the user, a transaction program for performing the transaction, etc.

The CPU 75 executes the programs and, thus, the service site unit 56, install registering unit 57, identifying unit 58, and transaction processing unit 59 (refer to FIG. 5) are configured by software.

The data storing unit 81 stores the user information database 54, transaction information database 55, numbering table, issuer master, and another database.

Next, a description is given of the electronic-money terminal 8 (refer to FIG. 1).

The electronic-money terminal 8 is a terminal device which communicates with the electronic-money function unit 12 of the mobile phone 7 by radio waves, and operates the value processing unit 28 (FIG. 4).

The electronic-money terminal 8 is installed at a cash register in a convenience store, and the user sets the mobile phone 7 to a predetermined portion of the electronic-money terminal 8 (reader/writer unit 8a), thereby charging the value and settling the value.

Hereinbelow, a description is given of the communication between the electronic-money terminal 8 and the mobile phone 7. The electronic-money terminal 8 performs the same processing of the electronic-money card 15.

The reader/writer unit 8a performs radio communication at short distance by using an antenna therein, and receives/sends the data by radio waves from/to the terminal antenna 35 in the electronic-money function unit 12.

At the start of communication with the mobile phone 7, the electronic-money terminal 8 reads the key information from the electronic-money function unit 12 (sends a command for reading the key information to the value processing unit 28 and receives the key information sent from the value processing unit 28). The key information is compared with the key information of the electronic-money terminal 8 and then it is checked to see if the electronic-money function unit 12 is regular.

The electronic-money terminal 8 determines that the electronic-money function unit 12 is regular and, thereafter, inputs a write command or subtract command to the value processing unit 28, thereby enabling the value processing unit 28 to perform the value processing.

The electronic-money terminal 8 is connected on a network to the electronic-money server 2 via a communication line, such as a digital phone line, and sends, to the electronic-money server 2, the information on the charge and settlement to the mobile phone 7.

The information sent to the electronic-money server 2 by the electronic-money terminal 8 is information for specifying the contents of the processing between the electronic-money terminal 8 and the electronic-money function unit 12, e.g., terminal ID (ID for identifying the electronic-money terminal 8), member shop ID, electronic-money No., the amount of money of the charged value, the amount of money of the settled value, date and time of charge or settlement.

Based on the information, the electronic-money server 2 confirms that the amount of money corresponding to the value stored in the electronic-money function unit 12 and which electronic-money terminal 8 and which electronic-money function unit 12 charge or settle how much value.

The electronic-money terminal 8 performs the charge of value and settlement to the electronic-money card 15, which will be described later, similarly to the electronic-money function unit 12.

According to the embodiment, the electronic-money terminal 8 is installed at a retail shop and performs the charge and settlement of value.

In addition, the electronic-money terminal 8 is installed at a fare collecting place from the user such as, an automatic vender, ticket gate at the station, stepwell, taxi, and entrance of a theater. In this case, the electronic-money terminal 8 for settlement only can be installed.

Further, at the place where many people visit, such as a public place or park, the electronic-money terminal 8 for charge only can be installed to charge the value.

The network connection between the electronic-money terminal 8 and the electronic-money server 2 is generally a digital phone line. In addition, the network connection between the electronic-money terminal 8 and the electronic-money server 2 is realized by a specific line.

A wireless terminal may be installed near the electronic-money terminal 8 and the connection may be realized by a radio line between the electronic-money terminal 8 and a wireless terminal. Since one wireless terminal communicates with a plurality of the electronic-money terminals 8 by radio waves, costs might be reduced, as compared with the install of lines to the individual electronic-money terminals 8. With this structure, advantageously, a plurality of electronic-money terminals 8 installed at the automatic vender are managed in a lump.

Further, a storage medium may be arranged to the electronic-money terminal 8, to store data on the processing contents of the communication between the electronic-money terminal 8 and the mobile phone 7, and a person in charge may collect the storage medium.

The structure is advantageous in the case of installing the electronic-money terminal 8 to a mobile member, such as a bus, taxi, airplane, or ship.

Next, a description is given of the electronic-money card 15 (refer to FIG. 1).

The electronic-money card 15 comprises a terminal antenna and an IC chip in a plastic case.

Figure 10:
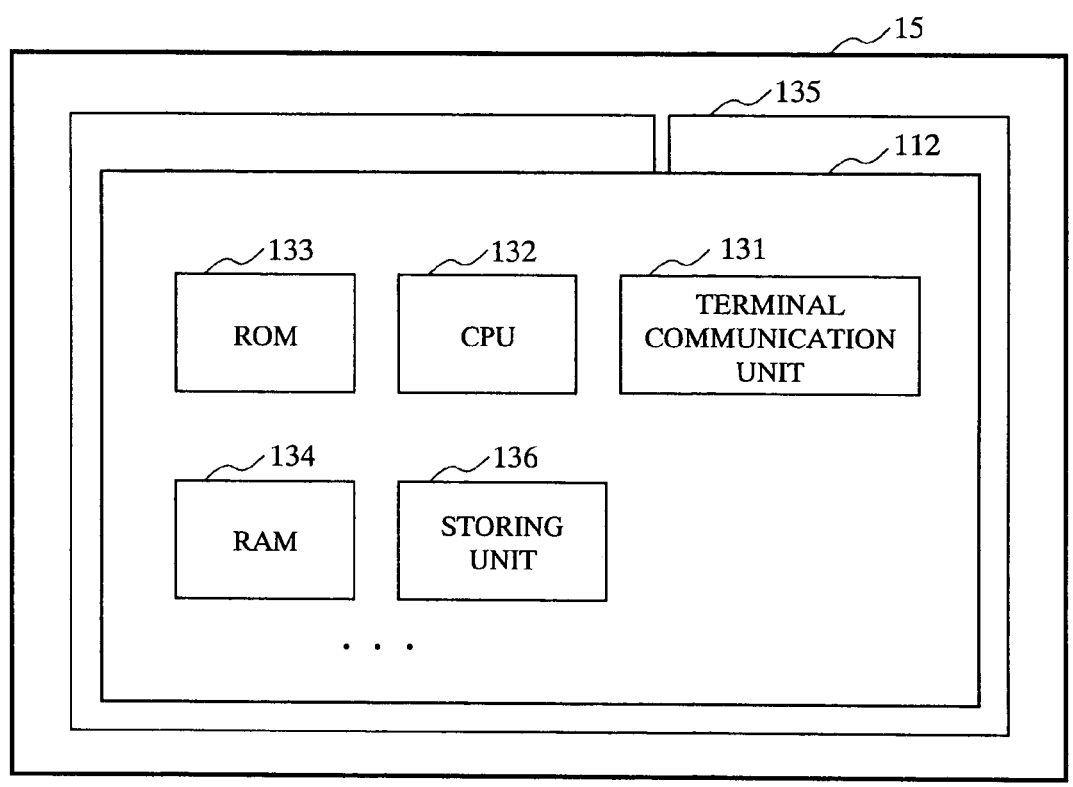
FIG. 10 is a diagram showing one example of the hardware structure of an electronic-money card.

FIG. 10 is a diagram showing an example of the hardware structure of the electronic-money card 15.

The electronic-money card 15 comprises: an IC chip 112; and a CPU 132, ROM 133, a RAM 134, a storing unit 136, and a terminal communication unit 131 which are mounted on the IC chip 112. The electronic-money card 15 supplies the power to the IC chip 112, and further comprises a terminal antenna 135 for receiving and sending signals.

The electronic-money card 15 is set at a predetermined position of the electronic-money terminal 8, similarly to the electronic-money function unit 12, thereby charging and settling the value in the non-contact state.

In this case, radio waves radiated by the electronic-money terminal 8 are received, and the terminal antenna 135 of the electronic-money card 15 generates the power, thereby supplying power for driving the IC chip 112. As mentioned above, the terminal antenna 135 generates the power and receives and sends the data from/to the electronic-money terminal 8.

Since the electronic-money function unit 12 of the mobile phone 7 receives the power from a power supply of the mobile phone 7, the IC chip of the electronic-money function unit 12 obtains the power from the electronic-money terminal 8 or a power supply of the mobile phone 7.

Generally, when the mobile phone 7 is turned on, the power is obtained from a battery of the mobile phone 7. When the mobile phone 7 is turned off, the power is obtained from the electronic-money terminal 8.

The CPU 132, ROM 133, RAM 134, storing unit 136, and terminal communication unit 131 which are mounted on the IC chip 112 have the same functions as those of the CPU 32, ROM 33, RAM 34, storing unit 34, and terminal communication unit 31 which are mounted on the electronic-money function unit 12.

That is, the storing unit 136 stores a value processing program and the CPU 132 executes the value processing program, thereby configuring the value processing unit by software. The storing unit 136 has a log data storing unit.

The operation of the value processing unit sets the electronic-money card 15 to the reader/writer unit of the electronic-money terminal 8, thereby charging the value and performing the settlement using the value.

Figure 11:
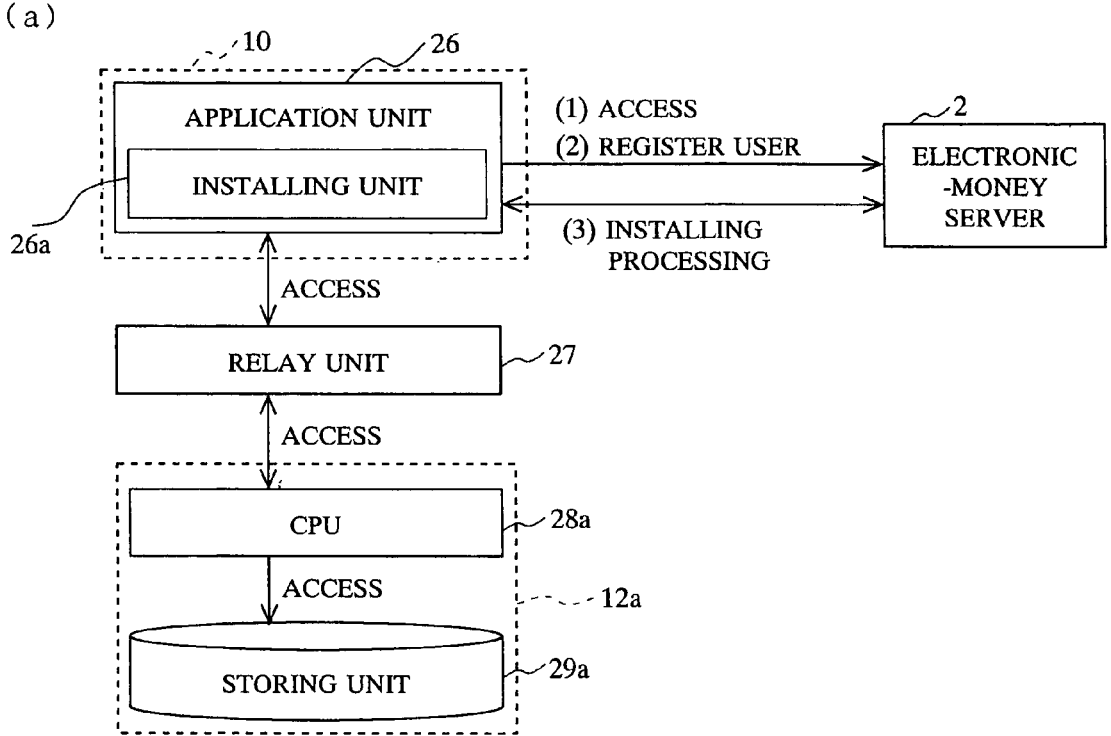
FIG. 11(a) is a diagram for explaining the operation of the mobile phone upon installing the value processing function.
FIG. 11(b) is a diagram for explaining the operation of the mobile phone after installing the value processing function.
Figure 11:
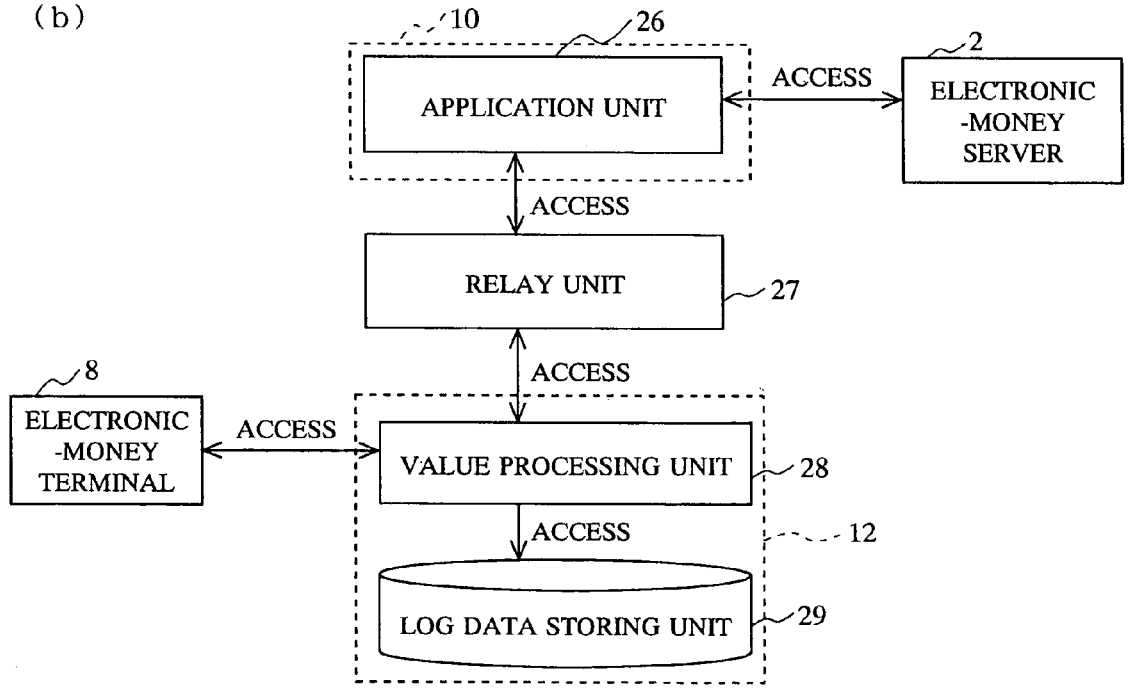

Next, a description is given of the operation of the components in the case of installing the value processing function by the electronic-money operating system 1 with the above-mentioned structure with reference to reference numerals shown in FIG. 11(*a*).

(1) The user starts the application mode after purchasing the mobile phone 7, thereby using the application unit 26. Then, the URL of the service site of the electronic-money server 2 is inputted to the application unit 26, and the service site unit 56 of the electronic-money server 2 is accessed from the mobile phone 7.

On the contrary, the service site unit 56 sends, to the mobile phone 7, the screen data for displaying the main menu screen.

Figure 12:
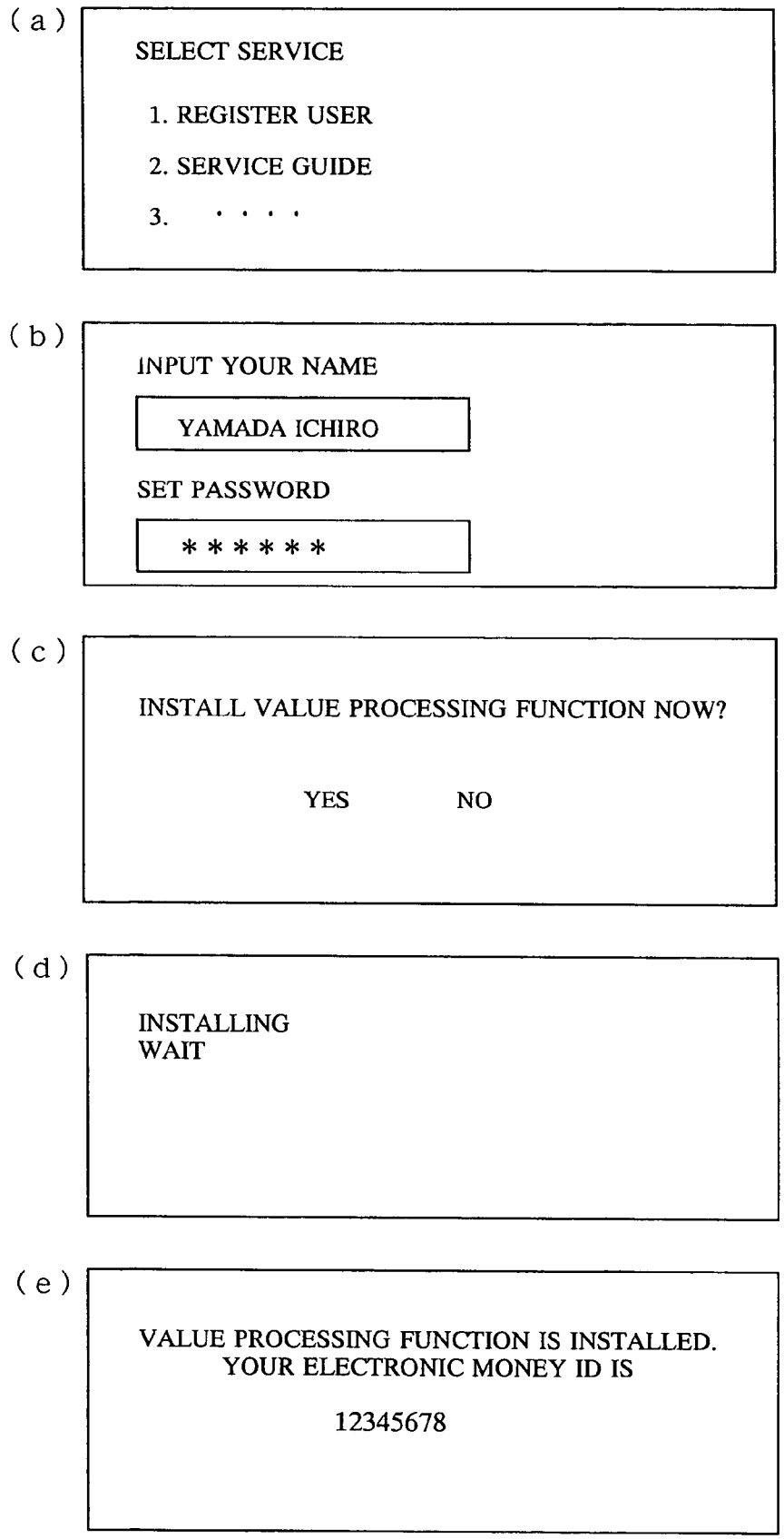
FIG. 12 is a diagram showing one example of a screen displayed on the mobile phone upon installing the value processing function.

FIG. 12(*a*) is a diagram showing an example of the main menu screen displayed on the display 21 (refer to FIG. 2) of the mobile phone 7.

Referring to FIG. 12(*a*), the services provided by the electronic-money server 2 is displayed every item on the main menu screen, and the user selects the item by operating the keyboard 22. Here, "1. Register user" is selected.

(2) The user selects the item "1. Register user" and then the install registering unit 57 starts in the electronic-money server 2 (FIG. 11(*a*)). First, the electronic-money server 2 sends the screen data for displaying the registering screen to the mobile phone 7.

FIG. 12(*b*) is a diagram showing an example of the registering screen displayed on the display 21.

The registering screen has a column for inputting a name, a column for inputting the set password, a column for selecting the issuer (not shown), and another input column. Necessary items are inputted on the registering screen by operating the keyboard 22.

After inputting the necessary item, the user clicks a sending button (not shown) displayed on the display 21. Thus, the input item is sent to the electronic-money server 2 from the mobile phone 7.

With respect to the selection of issuer, an issuer selecting screen is displayed on the display 21, and the user arbitrarily selects the issuer displayed on the display 21.

In the electronic-money server 2, the install registering unit 57 stores the registering information received from the mobile phone 7 to the user information database 54, and registers the user.

After registering the user, the install registering unit 57 sends the screen data for displaying the use clause. The use clause has an install selecting item for user selection as whether or not the value processing function is installed to the mobile phone 7. When the user agrees with the use clause, the value processing function is installed. When the user does not agree with the use clause, the value processing function is not installed.

FIG. 12(*c*) is a diagram showing one example of the install selecting item displayed on the display 21.

The user selects any of "YES" and "NO". When selecting "YES", the user is registered and then the install operation of the value processing function starts. When selecting "NO", the install operation does not start. When selecting "NO", the electronic-money server 2 is accessed later and the install operation is performed.

(3) When the user selects "YES", the install registering unit 57 starts the installing processing.

After that, the install registering unit 57 communicates with the installing unit 26*a* and simultaneously performs the installing processing.

First, in the mobile phone 7, the installing unit 26*a* (refer to FIG. 3) ensures the electronic-money area 36*a* in the storing unit 36 (refer to FIG. 5), and forms the program area 36*b* and the log data area 36*c*. When the electronic-money area 36*a* is ensured in advance, the step is omitted.

Then, the installing unit 26*a* installs the value processing program to the program area 36*b*.

Further, the installing unit 26*a* reads the IC chip ID and sends the IC chip ID to the electronic-money server 2.

In the electronic-money server 2, the install registering unit 57 receives the IC chip ID from the mobile phone 7, and stores the IC chip ID to the user information database 54. Further, the electronic-money server 2 issues an electronic-money ID and stores the electronic-money ID to the user information database 54.

Sequentially, the install registering unit 57 sends the numbered electronic-money ID and secret information, such as key information to the mobile phone 7.

In the mobile phone 7, the installing unit 26*a* writes, to the program area 36*b*, the electronic-money ID received from the electronic-money server 2 and the secret information, such as key information.

As mentioned above, the electronic-money server 2 and the installing unit 26*a* cooperatively install the value processing function to the IC function unit 12*a*.

During the installing processing, the installing unit 26*a* displays a screen as shown in FIG. 12(*d*) on the display 21.

After ending the installing processing, referring to FIG. 12(*e*), the electronic-money ID is displayed on the display 21.

The electronic-money ID is used for the user service. In addition, in the case of charging the value or settlement using the value, the information thereon and the electronic-money ID are recorded and are used for value management.

FIG. 11(b) is a diagram showing a relationship among the electronic-money function unit 12, electronic-money terminal 8, and the electronic-money server 2 after installing the value processing function.

Referring to FIG. 11(b), the value processing unit 28 directly receives the access from the electronic-money terminal 8. Further, the value processing unit 28 receives the access from the electronic-money server 2 via the application unit 26 and the relay unit 27.

The value processing unit 28 receives various commands from the electronic-money terminal 8 and the electronic-money server 2 and executes the commands, and processes the value stored in the log data storing unit 29.

Figure 13:
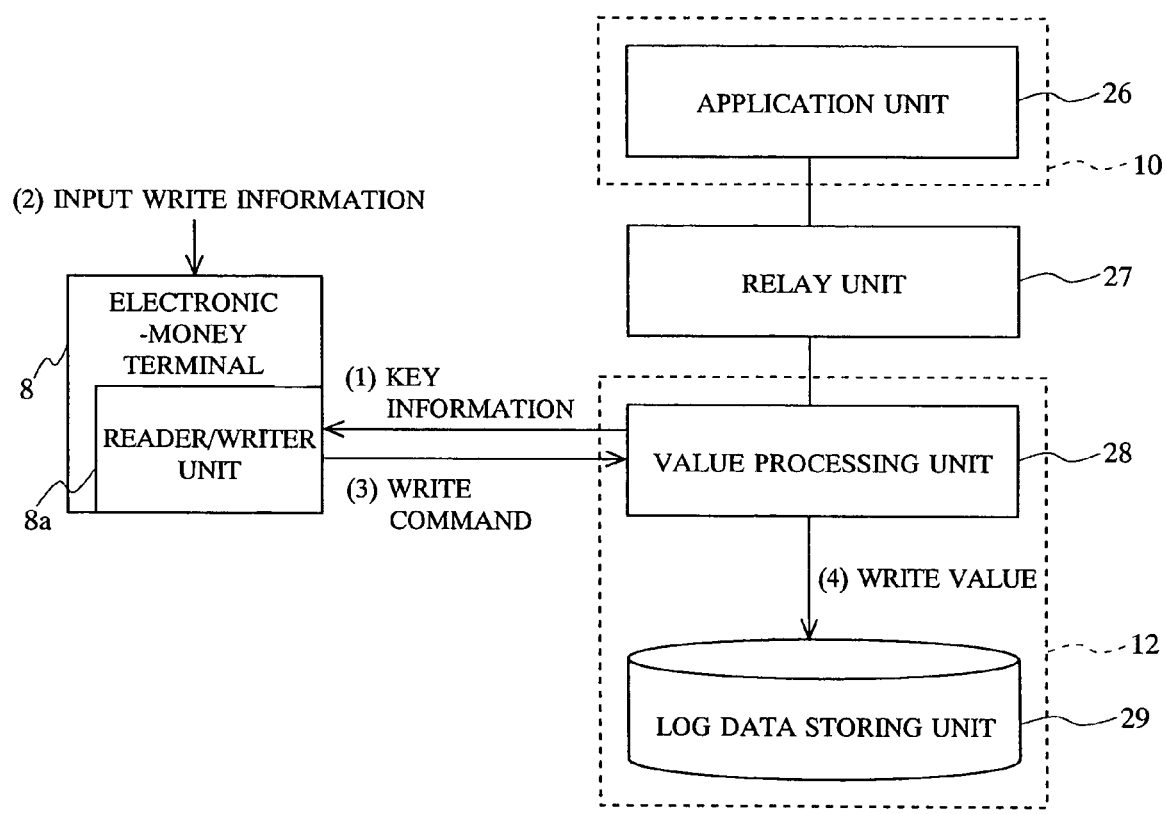
FIG. 13 is a diagram for explaining the case of charging the value from an electronic-money terminal to the mobile phone.

A description is given of the operation for charging the value from the electronic-money terminal 8 to the electronic-money function unit 12 as formed above with reference to reference numerals in FIG. 13.

(1) First, the mobile phone 7 is set to the reader/writer unit 8a of the electronic-money terminal 8. Then, the communication starts between the electronic-money function unit 12 and the electronic-money terminal 8.

The electronic-money terminal 8 requests the transmission of key information to the value processing unit 28. In response thereto, the value processing unit 28 reads the key information from the program area 36b (refer to FIG. 5) and sends the key information to the electronic-money terminal 8.

The electronic-money terminal 8 identifies, by using the key information received from the value processing unit 28, whether or not the electronic-money function unit 12 is regular. Further, the electronic-money terminal 8 reads and records the electronic-money ID from the value processing unit 28.

(2) The electronic-money terminal 8 receives the input of write information for specifying the amount of money for charge. For example, a person in charge inputs the write information from an input device arranged to the electronic-money terminal 8.

(3) The electronic-money terminal 8 generates a write command for charging the value corresponding to the money inputted, and sends the write command to the value processing unit 28.

(4) The value processing unit 28 receives the write command from the electronic-money terminal 8 and executes the command. Then, the value processing unit 28 adds the amount of money corresponding to the amount of money inputted to the current balance of value stored in the log data storing unit 29, and updates the log data.

As the result of the above processing, the value is charged to the electronic-money function unit 12 from the electronic-money terminal 8.

The settlement using the value is similarly performed. That is, the electronic-money terminal 8 receives the key information from the electronic-money function unit 12, identifies the electronic-money function unit 12, generates a subtract command of the amount of money corresponding to the settlement, and sends the command to the value processing unit 28. The value processing unit 28 executes the command and subtracts the balance of value.

The write command and the subtract command are inputted to the value processing unit 28 from the electronic-money server 2 via the application unit 26 and the relay unit 27, and the value is charged or settled. In this case, the application unit 26 reads the key information and sends the key information to the electronic-money server 2. Then, the electronic-money server 2 identifies the key information.

Figure 14:
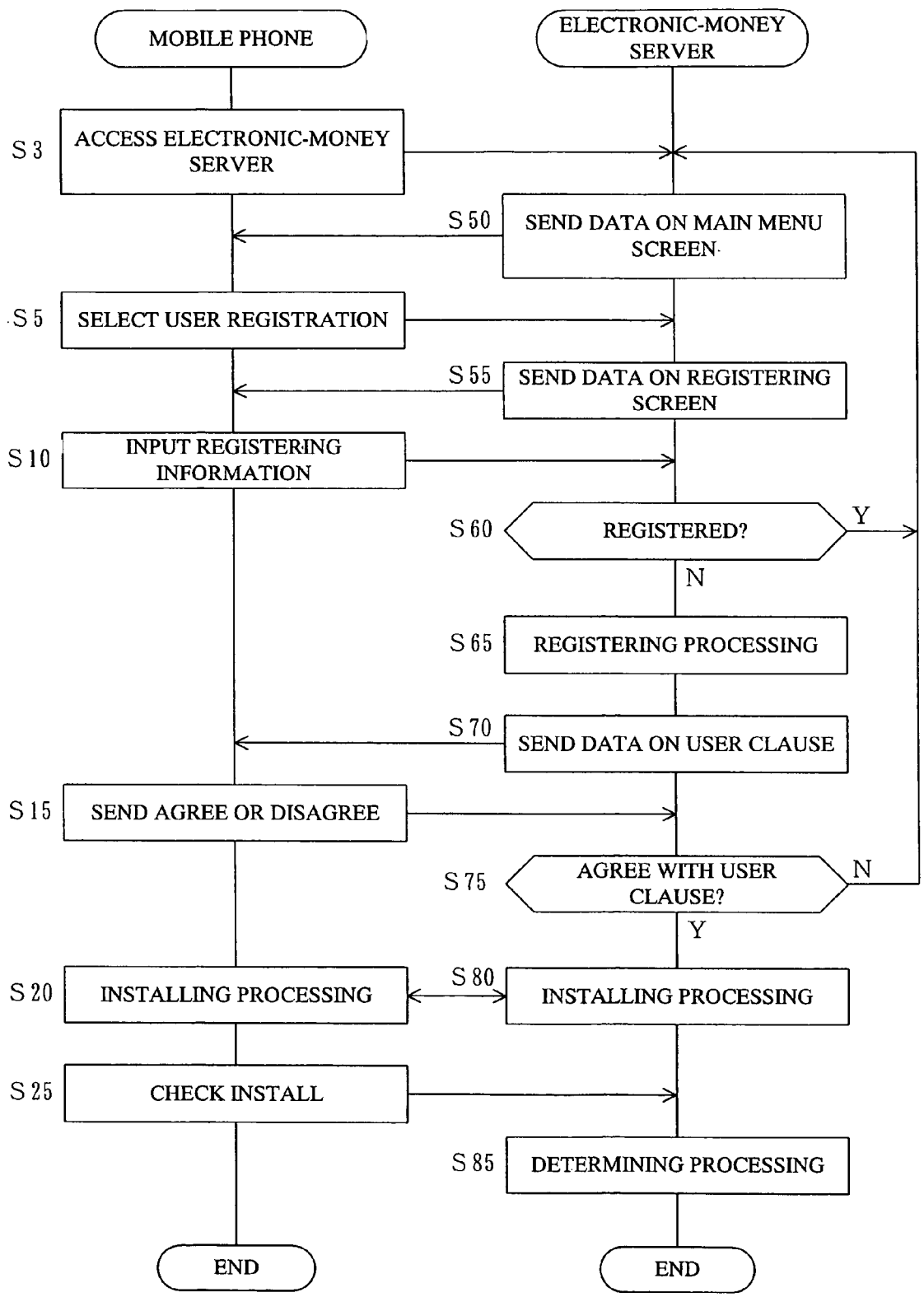
FIG. 14 is a flowchart for explaining the installing sequence of the value processing function.

Next, a description is given of the installing sequence of the value processing function to the mobile phone 7 with reference to a flowchart shown in FIG. 14.

First, in the mobile phone 7, the phone function unit 10 is set to the application mode, and the service site of the electronic-money server 2 is accessed (in step 3).

On the contrary, in the electronic-money server 2, the service site unit 56 sends, to the mobile phone 7, the screen data for displaying the main menu screen (in step 50).

The mobile phone 7 receives the screen data, and the application unit 26 displays the main menu screen on the display 21 by using the screen data.

The user selects various items on the main menu screen. Here, the user selects the user registration (in step 5).

On the contrary, in the electronic-money server 2, the install registering unit 57 starts and sends, to the electronic-money server 2, the screen data for displaying the registering screen (in step 55).

The mobile phone 7 receives the screen data, and the application unit 26 displays the registering screen on the display 21 by using the screen data.

The user inputs, from the registering screen, information necessary for registration, such as name, password, and selected issuer, and clicks a send button displayed on the registering screen. Then, the application unit 26 sends, to the electronic-money server 2, the inputted registering information (step 10).

The electronic-money server 2 receives the registering information sent from the mobile phone 7. The install registering unit 57 searches for the user information database 54 by using the received registering information, and checks whether or not the user is registered (in step 60). When the item of the user exists and the status indicates "installing" (Y; in step 60), a message indicating the user is registered is sent to the mobile phone 7 and then the processing returns to step 50.

When the user information database 54 does not includes the item of the user or when the user information database 54 includes the item of the user but the existing status indicates "non-installed" (default is caused during the install operation and then the install operation is executed again) (N; in step 60), the user is registered to the user information database 54 (in step 65). Then, the status of user item is set to the "non-installed".

Next, the install registering unit 57 sends data on the use clause for displaying the use clause to the mobile phone 7 (in step 70).

The mobile phone 7 receives the data on the use clause and the application unit 26 displays the use clause on the display 21 by using the data on the use clause.

The user reads the use clause, selects whether user agrees with the use clause and installs the value processing function or the user does not agree with the use clause and does not install the value processing function, and sends the selecting result to the electronic-money server 2 (in step 15).

The electronic-money server 2 receives the selecting result. When the user does not agree with the use clause (N; in step 75), the install registering unit 57 does not do install processing and the state of the electronic-money server 2 returns step 50.

When the user agrees with the use clause (Y; in step 75), the install registering unit 57 starts the installing processing, communicates with the installing unit 26a of the mobile phone 7, and performs the installing processing of the value processing function together with the installing unit 26a (in steps 80 and 20).

That is, the install registering unit 57 issues the electronic-money ID and sends the key information and the electronic-money ID to the mobile phone 7. The installing unit 26a reads the IC chip ID and sends the IC chip ID to the electronic-money server 2.

When the mobile phone 7 downloads, from the electronic-money server 2, the value processing program, the install registering unit 57 sends the value processing program to the electronic-money server 2.

The install registering unit 57 stores the IC chip ID received from the mobile phone 7 and the electronic-money ID number to the mobile phone 7 to the items of the user in the user information database 54.

The installing unit 26a installs the value processing program by using the key information and the electronic-money ID.

The mobile phone 7 ends the value processing program and then the application unit 26 displays an installing end message on the display 21 and the user checks the message. The user checks the message and then the application unit 26 sends a notification indicating the end of the install operation to the electronic-money server 2 (in step 25).

The electronic-money server 2 receives the notification of end and the install registering unit 57 updates the status of the item of the user in the user information database 54 and determines the install operation of the value processing function (in step 85).

When causing a default during installing the value processing function, the following processing is performed.

Before starting the installing processing (before steps 20 and 80), recovery processing is not performed and the electronic-money server 2 sends again, to the mobile phone 7, screen data for displaying the main menu screen.

Upon causing a default after starting the installing processing, the recovery processing is executed and the installing processing starts from the interrupt of processing.

The following advantages are obtained with the above-mentioned electronic-money operating system 1 according to the present invention.

(1) Since the key information and another information are sent to the mobile phone 7 directly from the electronic-money server 2 upon installing the value processing function, the secret information on the security and another secret information are not sent to an outsourcing partner, the information is easily managed.

(2) The mobile phone 7 is sold to the user without installing the value processing function to the IC function unit 12a (refer to FIG. 3). Therefore, costs for install operation are reduced.

(3) Similarly to the electronic-money card 15, the mobile phone 7 after installing the value processing function charges the value or performs the settlement using the value. Further, the value is charged and the settlement using the value is executed from the electronic-money server 2.

Embodiments according to the present invention have been described above. However, the present invention is not limited to the described embodiment and can be modified as defined by the scope of the claims.

For example, a mobile terminal device having the electronic-money function unit 12 is not limited to the mobile phone 7 and can be a mobile electronic device, such as a PDA (Personal Digital Assistant), or pocket bell, which can access the electronic-money server 2 via a network.

According to the embodiment, the IC chip having the same function of the IC chip in the electronic-money card 15 is installed in the mobile phone 7. The hardware structure is not limited to this. For example, the value processing program is installed in the storing unit 45 (refer to FIG. 5) in the phone function unit 10, and can be executed by the CPU 42. In this case, the phone function unit 10 has the function of the electronic-money function unit 12 and therefore the IC chip need not be installed in the mobile phone 7.

The invention claimed is:

1. A mobile terminal device having an Internet access function for access to the Internet to communicate the mobile terminal device with an electronic money server providing electronic money service, the mobile terminal device comprising:

information processing means for processing electronic information including money information;

storing means for storing the electronic information including the money information;

receiving means for receiving from the electronic money server secret information and an electronic money identification (ID);

means for downloading from the electronic money server a money information processing program using the received secret information and electronic money ID for enabling the information processing means to execute processing of the money information stored in the storing means;

installing means for installing into the storing means the money information processing program downloaded from the electronic money server and the electronic money ID and the secret information received by the receiving means while the mobile terminal device communicates only with the electronic money server;

sending means for sending to the electronic money server information necessary for enabling the electronic money server to provide electronic money service, the necessary information corresponding to the electronic money ID and being sent to the electronic server by the sending means before the money information processing program is downloaded from the electronic money server and the receiving means receives the electronic money ID and the secret information from the electronic money server; and a log data storing unit for storing a history of electronic information processed by the information processing means;

wherein while the mobile terminal device communicates with the electronic money server or an electronic terminal device, the money information processing program enables the information processing means to perform a money-amount information receiving function for receiving from the electronic money server or the electronic terminal device information corresponding to a change in an amount of money corresponding to the money information stared by the storing means by using the secret information installed in the storing means, to perform a money information processing function for changing the amount of money in accordance with the received information corresponding to the change in the amount of money, and to perform a history information recording function for recording the history of electronic information processed by the information processing means and stored in the log data storing unit;

wherein the installing means generates the log data storing unit in the storing means when the installing means installs into the storing means the money information processing program, the electronic money ID, and the secret information;

wherein the information processing means and the storing means comprise at least one IC chip;

wherein the necessary information sent by the sending means to the electronic money server comprises information identifying the IC chip; and wherein the receiving means receives the electronic money ID from the electronic money server after the electronic money server receives the information identifying the IC chip.

2. A mobile terminal device according to claim 1; wherein the secret information comprises identification information that enables the mobile terminal device to be identified by the electronic terminal device or the electronic money server.

3. A mobile terminal device according to claim 1; further comprising display means for displaying the electronic money ID received by the receiving means and installed by the installing means.

4. A mobile terminal device according to claim 2; further comprising display means for displaying the electronic money ID received by the receiving means and installed by the installing means.

5. A mobile terminal device according to claim 3; wherein the money information processing program enables the information processing means to send to the electronic terminal device the electronic money ID in response to receipt of the information corresponding to a change in the amount of money from the electronic terminal device when the information processing means performs the money-amount information receiving function.

6. A mobile terminal device according to claim 4; wherein the money information processing program enables the information processing means to send to the electronic terminal device the electronic money ID in response to receipt of the information corresponding to a change in the amount of money from the electronic terminal device when the information processing means performs the money-amount information receiving function.

7. An electronic money server for providing electronic money service using the mobile terminal device according to claim 1, the electronic money server comprising:
   connecting means for enabling Internet connection of the electronic money server to the mobile terminal device via the Internet access function of the mobile terminal device; and
   sending means for sending the secret information, the money information processing program, and the electronic money ID to the receiving means of the mobile terminal device when the electronic money server and the mobile terminal device are connected via the Internet.

8. A method executed by a computer for performing communication between a mobile terminal device according to claim 1 and an electronic money server for providing electronic money service using the mobile terminal device, comprising:
   enabling Internet connection of the electronic money server to the mobile terminal device via the Internet access function of the mobile terminal device; and
   sending the secret information, the money information processing program, and the electronic money ID to the receiving means of the mobile terminal device when the electronic money server and the mobile terminal device are connected via the Internet.

9. A mobile terminal device according to claim 1; wherein the mobile terminal device comprises a cellular mobile telephone having mobile phone functions.

10. A mobile terminal device according to claim 1; wherein the mobile terminal device comprises one of a wireless communications device, a wirelessly-equipped personal digital assistant (PDA), and a portable computer.

11. A mobile terminal device according to claim 1; wherein the sending means includes means for sending to the electronic money server user identification information for identifying a user of the mobile terminal device.

12. A mobile terminal device according to claim 11; wherein the user identification information comprises the information identifying the IC chip.

13. A mobile terminal device according to claim 11; wherein the user identification information comprises the electronic money ID.

14. A mobile terminal device according to claim 1; wherein the installing means installs the secret information, money information processing program, and electronic money ID using the secret information.

15. A mobile terminal method executed by a computer having an information processing device for processing electronic information, a storage device for storing the electronic information, and an Internet access function for access to the Internet to communicate a mobile terminal device with an electronic money server providing electronic money service, the mobile terminal method comprising:
   sending to the electronic money server information necessary for enabling the electronic money server to provide electronic money service;
   receiving from the electronic money server, after the necessary information is sent to the electronic money server, secret information and an electronic money identification (ID) corresponding to the necessary information;
   downloading from the electronic money server a money information processing program using the received secret information and electronic money ID for enabling the information processing device to execute processing of money information stored in the storing device;
   installing into the storage device the money information processing program downloaded from the electronic money server and the electronic money ID and the secret information received from the electronic money server while the mobile terminal device communicates with the electronic money server; and
   generating a log data storing unit in the storage device for storing a history of electronic information processed by the information processing;
   wherein while the mobile terminal device communicates with the electronic money server or an electronic terminal device, the money information processing program enables the information processing device to perform a money-amount information receiving function for receiving from the electronic money server or the electronic terminal device information corresponding to a change in an amount of money corresponding to the money information stored by the storage device by using the secret information installed in the storage device, to perform a money information processing function for changing the amount of money in accordance with the received information corresponding to the change in the amount of money, and to perform a history information recording function for recording the history of electronic information processed by the information processing device and stored in the log data storing unit;
   wherein the log data storing unit is generated in the storage device when the money information processing program, the electronic money ID, and the secret information are installed into the storage device;
   wherein the information processing device and the storage device comprise at least one IC chip;

wherein the necessary information sent to the electronic money server comprises information identifying the IC chip; and wherein the electronic money ID is received from the electronic money server after the electronic money server receives the information identifying the IC chip.

16. A computer program product including a computer readable medium having instructions for causing the execution of a mobile terminal method using a computer having an information processing device for processing electronic information, a storage device for storing the electronic information, and an Internet access function for access to the Internet to communicate a mobile terminal device with an electronic money server providing electronic money service, the instructions causing the computer to:

send to the electronic money server information necessary for enabling the electronic money server to provide electronic money service;

receive from the electronic money server, after the necessary information is sent to the electronic money server, secret information and an electronic money identification (ID) corresponding to the necessary information;

download from the electronic money server a money information processing program using the received secret information and electronic money (ID) for enabling the information processing device to execute processing of money information stored in the storing device;

install into the storage device the money information processing program downloaded from the electronic money server and the electronic money ID and the secret information received from the electronic money server while the mobile terminal device communicates only with the electronic money server; and generate a log data storing unit in the storage device for storing a history of electronic information processed by the information processing device;

wherein while the mobile terminal device communicates with the electronic money server or an electronic terminal device, the money information processing program enables the information processing device to perform a money-amount information receiving function for receiving from the electronic money server or the electronic terminal device information corresponding to a change in an amount of money corresponding to the money information stored by the storage device by using the secret information installed in the storage device, to perform a money information processing function for changing the amount of money in accordance with the received information corresponding to the change in the amount of money, and to perform a history information recording function for recording the history of electronic information processed by the information processing device and stored in the log data storing unit;

wherein the log data storing unit is generated in the storage device when the money information processing program, the electronic money ID, and the secret information are installed into the storage device;

wherein the information processing device and the storage device comprise at least one IC chip;

wherein the necessary information sent to the electronic money server comprises information identifying the IC chip; and wherein the electronic money ID is received from the electronic money server after the electronic money server receives the information identifying the IC chip.

17. A mobile terminal device for communication via an Internet connection to an electronic money server providing electronic money service, the mobile terminal device comprising:

an information processing unit that processes electronic money information;

a storage unit that stores the electronic money information;

a receiving unit that receives from the electronic money server an electronic money identification (ID) and a mobile terminal identification (ID) identifying the mobile terminal device;

a downloading unit that downloads from the electronic money server a money information processing program using the electronic money ID and the mobile terminal ID for enabling the information processing unit to execute processing of the money information stored in the storage unit;

an installation unit that installs into the storage unit the money information processing program downloaded by the downloading unit and the electronic money ID and the mobile terminal ID received by the receiving unit while the mobile terminal device communicates only with the electronic money server;

a sending unit that sends to the electronic money server information necessary for enabling the electronic money server to provide electronic money service, the necessary information being sent to the electronic server before the downloading unit downloads the money information processing program and the receiving unit receives electronic money ID and the mobile terminal ID; and a log data storing unit for storing a history of electronic information processed by the information processing unit;

wherein while the mobile terminal device Communicates with the electronic money server or an electronic terminal device, the money information processing program enables the information processing unit to perform a money-amount information receiving function for receiving from the electronic money server or the electronic terminal device information corresponding to a change in an amount of money corresponding to the money information stored by the storage unit by using the mobile terminal ID installed in the storage unit, to perform a money information processing function for changing the amount of money in accordance with the received information corresponding to the change in the amount of money, and to perform a history information recording function for recording the history of electronic information processed by the information processing unit and stored in the log data storing unit;

wherein the installation unit generates the log data storing unit in the storage unit when the installation unit installs into the storage unit the money information processing program, the electronic money ID, and the mobile terminal ID;

wherein the information unit and the storage unit comprise at least one IC chip;

wherein the necessary information sent by the sending unit to the electronic money server comprises information identifying the IC chip; and wherein the receiving unit receives the electronic money ID from the electronic money server after the electronic money server receives the information identifying the IC chip.

18. A mobile terminal device according to claim 17; wherein the mobile terminal device comprises a cellular mobile telephone having mobile phone functions.

19. A mobile terminal device according to claim 17; wherein the mobile terminal device comprises one of a wireless communications device, a wirelessly-equipped personal digital assistant (PDA), and a portable computer.

20. A mobile terminal device according to claim 17; wherein the information processing unit and the storage unit comprise at least one IC chip; and wherein the mobile terminal ID comprises information identifying the IC chip.

21. A mobile terminal device according to claim 20; wherein the sending unit sends to the electronic money server user identification information for identifying a user of the mobile terminal device.

22. A mobile terminal device according to claim 21; wherein the user identification information comprises the information identifying the IC chip.

23. A mobile terminal device according to claim 21; wherein the user identification information comprises the electronic money ID.

24. A mobile terminal device according to claim 17; wherein the installing unit installs the money information processing program and the electronic money ID using the mobile terminal ID.

25. An electronic money server for providing electronic money service using the mobile terminal device according to claim 17, the electronic money server comprising:
  connecting means for enabling Internet connection of the electronic money server to the mobile terminal device; and
  sending means for sending the mobile terminal ID, the money information processing program, and the electronic money ID to the receiving unit of the mobile terminal device when the electronic money server and the mobile terminal device are connected via the Internet.

* * * * *